United States Patent
Hussain et al.

(10) Patent No.: US 12,399,729 B1
(45) Date of Patent: Aug. 26, 2025

(54) USER INTERFACE FOR SECURITY EVENTS

(71) Applicant: SimpliSafe, Inc., Boston, MA (US)

(72) Inventors: Nadeem Hussain, Worcester, MA (US); Jessica Pitocco, Arlington, MA (US); Alice Chiang, Arlington, MA (US); Madeleine Fougere, Seattle, WA (US)

(73) Assignee: SimpliSafe, Inc., Boston, MA (US)

( * ) Notice: Subject to any disclaimer, the term of this patent is extended or adjusted under 35 U.S.C. 154(b) by 0 days.

(21) Appl. No.: 19/058,137

(22) Filed: Feb. 20, 2025

Related U.S. Application Data

(60) Provisional application No. 63/664,220, filed on Jun. 26, 2024.

(51) Int. Cl.
*G06F 9/451* (2018.01)
*G06F 3/0482* (2013.01)
*G06F 3/0485* (2022.01)

(52) U.S. Cl.
CPC .......... *G06F 9/451* (2018.02); *G06F 3/0482* (2013.01); *G06F 3/0485* (2013.01)

(58) Field of Classification Search
CPC ....... G06F 9/451; G06F 3/0482; G06F 3/0485
USPC ........................................................ 715/719
See application file for complete search history.

(56) References Cited

U.S. PATENT DOCUMENTS

| | | | |
|---|---|---|---|
| 11,857,363 B2 * | 1/2024 | Chiang | A61B 8/4427 |
| 11,863,848 B1 * | 1/2024 | Lythcott-Haims | G06F 3/0482 |
| 2007/0044010 A1 * | 2/2007 | Sull | G06F 16/71 |
| | | | 709/201 |
| 2009/0076394 A1 * | 3/2009 | Wong | G01S 7/52038 |
| | | | 382/128 |
| 2016/0112524 A1 | 4/2016 | Sutou et al. | |
| 2016/0364129 A1 | 12/2016 | McLean et al. | |
| 2022/0308742 A1 | 9/2022 | Ziv et al. | |
| 2023/0014775 A1 * | 1/2023 | Dotan-Cohen | H04L 51/046 |
| 2023/0289046 A1 * | 9/2023 | Matsushita | G06F 16/16 |
| 2023/0315271 A1 * | 10/2023 | Milne | G06F 21/44 |
| | | | 715/754 |
| 2024/0045572 A1 * | 2/2024 | Penha | G11B 27/005 |
| 2024/0054158 A1 * | 2/2024 | Hooper | G06F 16/635 |
| 2024/0103891 A1 * | 3/2024 | Minamisako | G06F 3/04883 |

(Continued)

OTHER PUBLICATIONS

International Search Report and Written Opinion mailed Jul. 28, 2025 for International Patent Application No. PCT/US2025/030103.

*Primary Examiner* — William D Titcomb
(74) *Attorney, Agent, or Firm* — Pierce Atwood LLP

(57) ABSTRACT

An application may provide a user interface to (i) play back video within a first region of a screen and (ii) to display interactive elements corresponding to features detected in the video, the interactive elements being displayed in a second region of the screen. The application may determine that play back of the video has reached a first temporal position in the video that corresponds to a first interactive element displayed in the second region. The application may cause a change in an appearance of the first interactive element to visually distinguish the first interactive element from others of the interactive elements, the change being temporary so that upon advancement of play back of the video beyond the first temporal position the appearance of the first interactive element reverts back to the appearance as displayed before the first temporal position in the video was reached.

20 Claims, 11 Drawing Sheets

(56) References Cited

U.S. PATENT DOCUMENTS

| | | | |
|---|---|---|---|
| 2024/0104961 A1* | 3/2024 | Ang | G04G 9/007 |
| 2024/0406304 A1* | 12/2024 | Foss | G06F 1/3206 |
| 2024/0419317 A1* | 12/2024 | Osipov | A63F 13/245 |
| 2025/0005904 A1* | 1/2025 | Miyauchi | G06T 7/90 |
| 2025/0104738 A1* | 3/2025 | Hsu | G11B 27/007 |

* cited by examiner

300

302 — Provide, by an application of a computing device, a user interface to (i) play back video within a first region of a screen and (ii) to display a plurality of interactive elements corresponding to features detected in the video, the plurality of interactive elements being displayed in a second region of the screen different from the first region

304 — Determine, by the application, that play back of the video has reached a first temporal position in the video that corresponds to a first interactive element of the plurality of interactive elements displayed in the second region

306 — Cause, by the application, a change in an appearance of the first interactive element to visually distinguish the first interactive element from others of plurality of interactive elements, the change being temporary so that upon advancement of play back of the video beyond the first temporal position the appearance of the first interactive element reverts back to the appearance as displayed before the first temporal position in the video was reached

| Event ID | Event Timestamp | User ID | Location ID | Camera ID | Images | First Frame Time | Feature Indicators | Event Status | Event Disposition |
|---|---|---|---|---|---|---|---|---|---|
| E1 | T1 | U1 | L1 | C1 | I1 | FFT1 | FI1 | ES1 | ED1 |
| E2 | T2 | U2 | L2 | C2 | I2 | FFT2 | FI2 | ES2 | ED2 |
| E3 | T3 | U2 | L2 | C3 | I3 | FFT3 | FI3 | ES3 | ED3 |
| E4 | T4 | U1 | L1 | C1 | I3 | FFT4 | FI4 | ES4 | ED4 |

| Feature Type | Feature Image Pointer | Time Offset (from First Frame Time) | Feature Metadata |
|---|---|---|---|
| FT1 | FIP1 | TO1 | FM1 |
| FT1 | FIP2 | TO2 | FM2 |
| FT3 | FIP3 | TO3 | FM3 |
| FT4 | FIP4 | TO4 | FM4 |
| FT5 | FIP5 | TO5 | FM5 |
| FT6 | FIP6 | TO6 | FM6 |
| FT7 | FIP7 | TO7 | FM7 |
| FT8 | FIP8 | TO8 | FM8 |

(432, 434, 436, 438)

USER INTERFACE FOR SECURITY EVENTS

CROSS-REFERENCE TO RELATED APPLICATIONS

This application claims the benefit under 35 U.S.C. § 119 (e) of U.S. Provisional Application Ser. No. 63/664,220, entitled USER INTERFACE FOR SECURITY EVENTS, filed Jun. 26, 2024, the entire contents of which are incorporated herein by reference.

BACKGROUND

Some security systems enable remote monitoring of locations using cameras and other equipment.

SUMMARY

In some aspects, the techniques described herein relate to a method, including: providing, by an application of a computing device, a user interface to (i) play back video within a first region of a screen and (ii) to display a plurality of interactive elements corresponding to features detected in the video, the plurality of interactive elements being displayed in a second region of the screen different from the first region; determining, by the application, that play back of the video has reached a first temporal position in the video that corresponds to a first interactive element of the plurality of interactive elements displayed in the second region; and causing, by the application, a change in an appearance of the first interactive element to visually distinguish the first interactive element from others of plurality of interactive elements, the change being temporary so that upon advancement of play back of the video beyond the first temporal position the appearance of the first interactive element reverts back to the appearance as displayed before the first temporal position in the video was reached.

In some aspects, the techniques described herein relate to a method, including: receiving, by an application, first data representing video of an event detected by a camera, second data representing at least first a first feature detected in the video, and third data indicative of a first temporal position within the video at which the first feature was detected; causing, by the application and using the first data, a device to play back at least a portion of the video within a first region of a screen; causing, by the application and using the second data, the device to display a first user interface (UI) element indicative of the first feature within a second region of the screen; determining, by the application, that playback of the video has reached the first temporal position; and causing, by the application and based at least in part the third data and the playback of the video having reached the first temporal position, a change in an appearance of the first UI element to visually distinguish the first UI element from at least a second UI element displayed on the screen, the second UI element being indicative of a second feature detected in the video.

BRIEF DESCRIPTION OF THE DRAWINGS

Additional examples of the disclosure, as well as features and advantages thereof, will become more apparent by reference to the description herein taken in conjunction with the accompanying drawings which are incorporated in and constitute a part of this disclosure. The figures are not necessarily drawn to scale.

FIG. 3 shows an example routine that may be executed by an application hosted on a user device, in accordance with some implementations of the present disclosure.

FIGS. 4A and 4B show example tables or data structures that may be used to store the records and information for various events detected by a security system, according to some implementations of the present disclosure.

DETAILED DESCRIPTION

Figure 1A:
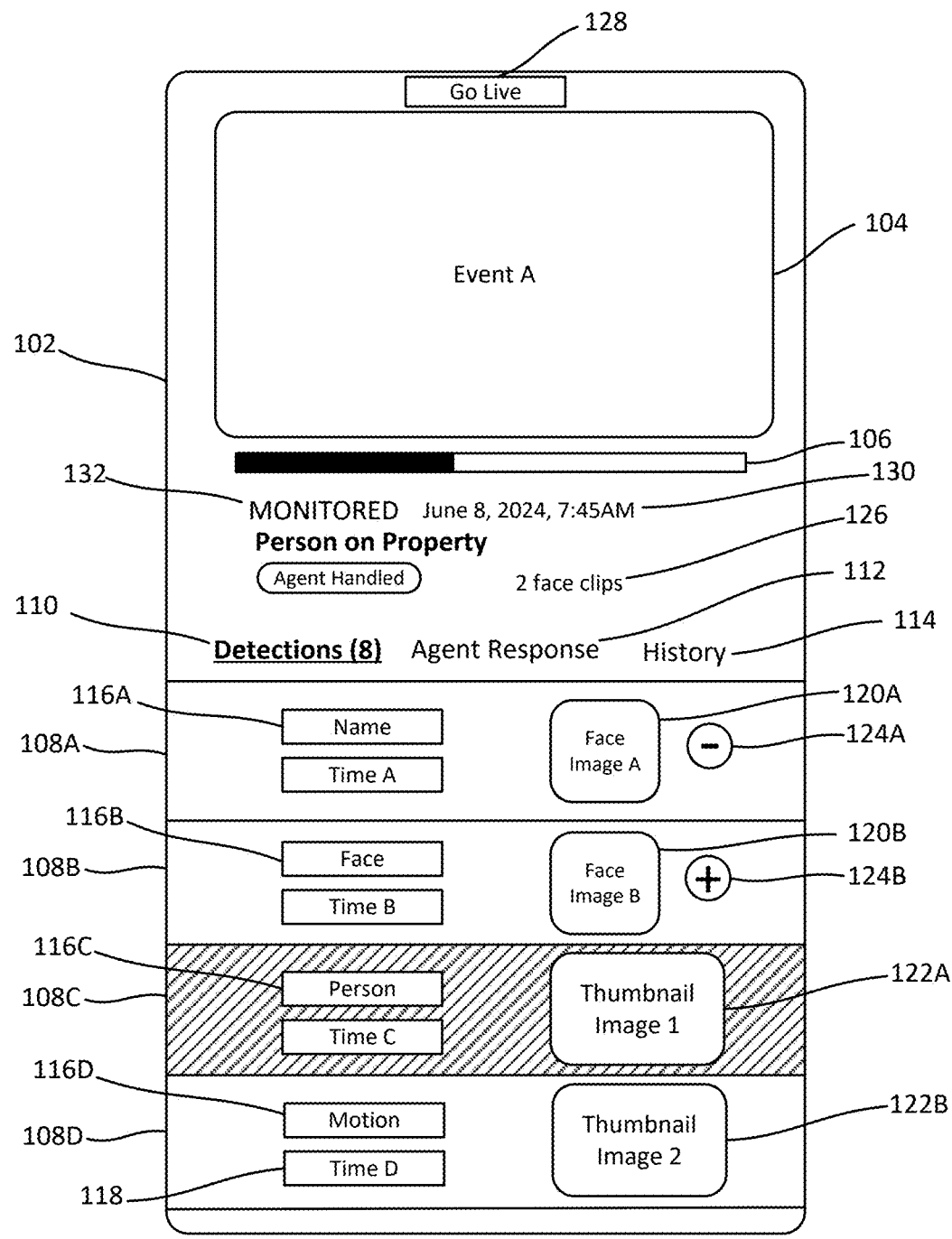
FIG. 1A shows a first example screen that may be presented on a user device to display event records generated by a security system, according to some implementations of the present disclosure.

For the purposes of promoting an understanding of the principles of the present disclosure, reference will now be made to the examples illustrated in the drawings, and specific language will be used to describe the same. It will nevertheless be understood that no limitation of the scope of the examples described herein is thereby intended.

Some security systems provide applications (e.g., mobile apps) that allow their customers to review recorded videos of events captured by cameras monitoring their properties. For instance, a user may receive a notification via an app that a new event has been detected and may select one or more user interface (UI) elements to launch a video player to view a recorded videos for the detected event. Some such systems can also perform computer-vision (CV) processing on the recorded videos to detect particular features within frames of the video, such as by detecting motion, people, faces, etc., and can present a timeline of such detections via the app, thus allowing the user to scroll through a list of UI elements representing the detected features. Such UI elements are referred to herein as "detection UI elements." Although the video player and associated detection UI elements both provide useful information as independent tools for a user, there is little integration between the two tools beyond presenting them on the same screen while the user is reviewing the detected event. As such, with a such system, a user may have difficulty understanding the interrelationship between the video being played back and the detection UI elements being displayed and as a result may have a poor experience.

Offered is a security system in which an application may present recorded video and detection UI elements for a detected event in an integrated fashion that significantly improves the user experience and utility of the application. For instance, in some implementations, the application may be configured to indicate (e.g., by highlighting, tagging, or otherwise flagging) respective detection UI elements presented on a screen as a video player reaches frames of a video in which the features of the detection UI elements (e.g., motion, people, faces, etc.) were detected, thus allowing the user to readily correlate respective detection UI elements with particular portions of the video that is being played back. The ability of a user to readily understand the temporal between the video being played back and the detection UI elements being displayed together with such video can greatly enhance the user's ability to understand why the system recorded the event and what the user should be looking for while reviewing it.

In some implementations, during playback of the recorded video, the application may further cause the list of detection UI elements to scroll on the screen, as needed, so that the currently indicated detection UI element remains included among the currently displayed detection UI elements and not hidden off screen to maintain that correlation between detection UI elements and video being displayed so that a user can readily understand a particular event at their property. In some implementations, such automated scrolling functionality may be disabled at least temporarily if the user interacts with the detection UI element list in at least certain ways, e.g., to manually scroll through the list of detection UI elements. Further, in some implementations, selection of a detection UI element by the user may cause the video player to jump to a frame of the recorded video that includes the detected feature to which the detection item relates, or to a position shortly prior to such a frame, thus allowing the user to quickly navigate to relevant portions of the recorded video as the user is scrolling through or otherwise reviewing the displayed list of detection UI elements.

FIG. 1A shows a first example screen 102 that may be presented by an application (e.g., a mobile app) in accordance with some embodiments of the present disclosure. In some implementations, for example, the screen 102 may be presented by an application 228 hosted on a user device 214 operated by a user 216, as described below in connection with FIG. 2. As shown in FIG. 1A, the screen 102 may include a video playback window 104 in which recorded video for a particular event being reviewed by the user 216 may be presented, as well as a progress bar 106 showing a relative temporal position of the currently displayed frame of the video within the recorded video clip. In some implementations, the user 216 may selectively pause or restart playback of the recorded video by tapping on the video playback window 104 and/or may navigate to a particular section of the recorded video by tapping on a corresponding location on the progress bar 106.

As illustrated, the application 228 may additionally cause the screen 102 to present a plurality of detection UI elements 108 organized chronologically, with the earlier (in time) detection UI elements being presented higher on the screen 102 than the later (in time) detection UI elements 108. The user 216 may cause the application 228 to present the detection UI elements 108 below the video playback window 104 on the screen 102, for example, by selecting a "detections" UI element 110. As indicated, in some implementations, the UI element 110 may include a numerical indicator (e.g., "8") representing the number of detection UI elements 108 that are available for review by the user 216. In some implementations, the user 216 may instead select a UI element 112 to cause the application 228 to present, below the video playback window 104, information about actions a monitoring agent 212 took when responding to the event and/or may select the UI element 114 to cause the application 228 to present, below the video playback window 104, information concerning other recent events that were also detected at the monitored location 204.

When the UI element 110 has been selected (as illustrated in FIG. 1A), and the quantity of detection UI elements 108 available for review exceeds the number detection UI elements (e.g., four detection UI elements) that can be displayed within the region of the screen 102 under the video playback window 104, the application 228 may allow the user 216 to selectively scroll through the list of detection UI elements 108 to view a different set of the available detection UI elements 108. For instance, in some implementations, the user 216 may drag a finger up or down on the portion of the screen 102 displaying the detection UI elements 108 to cause the list of detection UI elements 108 to scroll on the screen 102 in the direction of finger movement. In some implementation, the application 228 may permit the user 216 to manually scroll through the list of detection UI elements 108 either during playback of the video in the video playback window 104 or when the video is paused, e.g., in response to the user 216 tapping on the video playback window 104 or otherwise.

As shown in FIG. 1A, the detection UI elements 108 presented on the screen 102 may include respective indicators 116 representing the types of detections (e.g., motion, person, face, recognized face, etc.) they represent, as well as respective time markers 118 representing the times of day at which the video frames including the detected features were recorded. In the illustrated example, the detection UI element 108A corresponds to a video frame in which a feature (e.g., a recognized face) was identified, the detection UI element 108B corresponds to a video frame in which another feature (e.g., an unrecognized face-a face that was detected but not recognized as belonging to a specific individual) was detected, the detection UI element 108C corresponds to a video frame in which yet another feature (e.g., a person) was detected, and the detection UI element 108D corresponds to a video frame for which still another feature (e.g., motion) was detected. As shown in FIG. 1A, detection UI elements 108 for recognized faces (e.g., see detection UI element 108A) and unrecognized faces (e.g., see detection UI element 108B) may include facial images of people. Such face images 120 may be acquired, for example, by cropping a region of an image frame from the recorded video in which the corresponding face was detected. As also shown in FIG. 1A, detection UI elements 108 for people (e.g., see detection UI element 108C) and motion (e.g., see detection UI element 108D), may include thumbnail images 122 showing the frames of the recorded video in which such features were identified.

As illustrated immediately below the video playback window 104, in some implementations, the screen 102 may also display other information about the detected event, such as a location of the event (e.g., "Lake House"), a time and date at which the event was detected (e.g., "Jun. 8, 2024, 7:45 AM"), a description of the event (e.g., "Person on Property"), a disposition of the event (e.g., "Agent Handled"), and a value 178 indicating of a number of faces that were detected in the recorded video for the event.

The value 126 may, for example, apprise the user 216 of the existence of detection UI elements 108 that represent detected faces (e.g., detection UI elements 108A and 108B) with respect to which the user 216 may want to take an action, e.g., by selecting a UI element 124A, 124B adjacent a face image 120A, 120B to associate or disassociate a given face image 120 with a visitor profile. For instance, if the user 216 determines that a name indicated by the detection type indicator 116A is inaccurate, e.g., because facial recognition processing performed by the remote image processing component 222 (described below in connection with FIG. 2) misidentified the person to whom the face image 120A belongs, the user 216 may select the UI element 124A to dissociate the face image 120A from the visitor profile for the person indicated by the name. Additionally or alternatively, if the detection type indicator 116B indicates that an unrecognized face was detected by the remote image processing component 222 and the user 216 determines that the face image 120B belongs to a particular person, the user 216 may select the UI element 124B to associate the face image 120B with a visitor profile for the person, including creating a new visitor profile for the person if one does not already exist. As described in more detail below in connection with FIG. 2, in some implementations, the face images 120 associated with visitor profiles may be used by the remote image processing component 222 to perform facial recognition processing on video or other images acquired by a camera at a monitored location 204 and/or by the monitoring agents 212 to visually identify particular individuals when evaluating such video or other images.

Advantageously, in some implementations, the application 228 may be configured to indicate (e.g., by highlighting, tagging, or otherwise flagging) on the screen 102 respective detection UI elements 108 as the played back video reaches frames of the recorded video in which the features for those detection UI elements 108 (e.g., motion, people, faces, etc.) were detected, thus allowing the user to readily correlate respective detection UI elements 108 with particular portions of the video that is being played back. In the example screen 102 shown in FIG. 1A, for instance, the detection UI element 108C is highlighted to indicate that the video being presented in the video playback window 104 has reached the frame represented by the thumbnail image 122A in which a person was detected. It should be appreciated, however, that any of a number of other types of indicators may be used in addition to or in lieu of highlighting, such as the addition of a circle, square, check mark, etc., adjacent the detection UI element 108 that is being indicated, or an annotation, e.g., a red or other prominently colored rectangle, on or about an entire detection UI element 108 or some portion of a detection UI element 108, e.g., a face image 120 or a thumbnail image 122, that is being indicated.

Figure 1B:
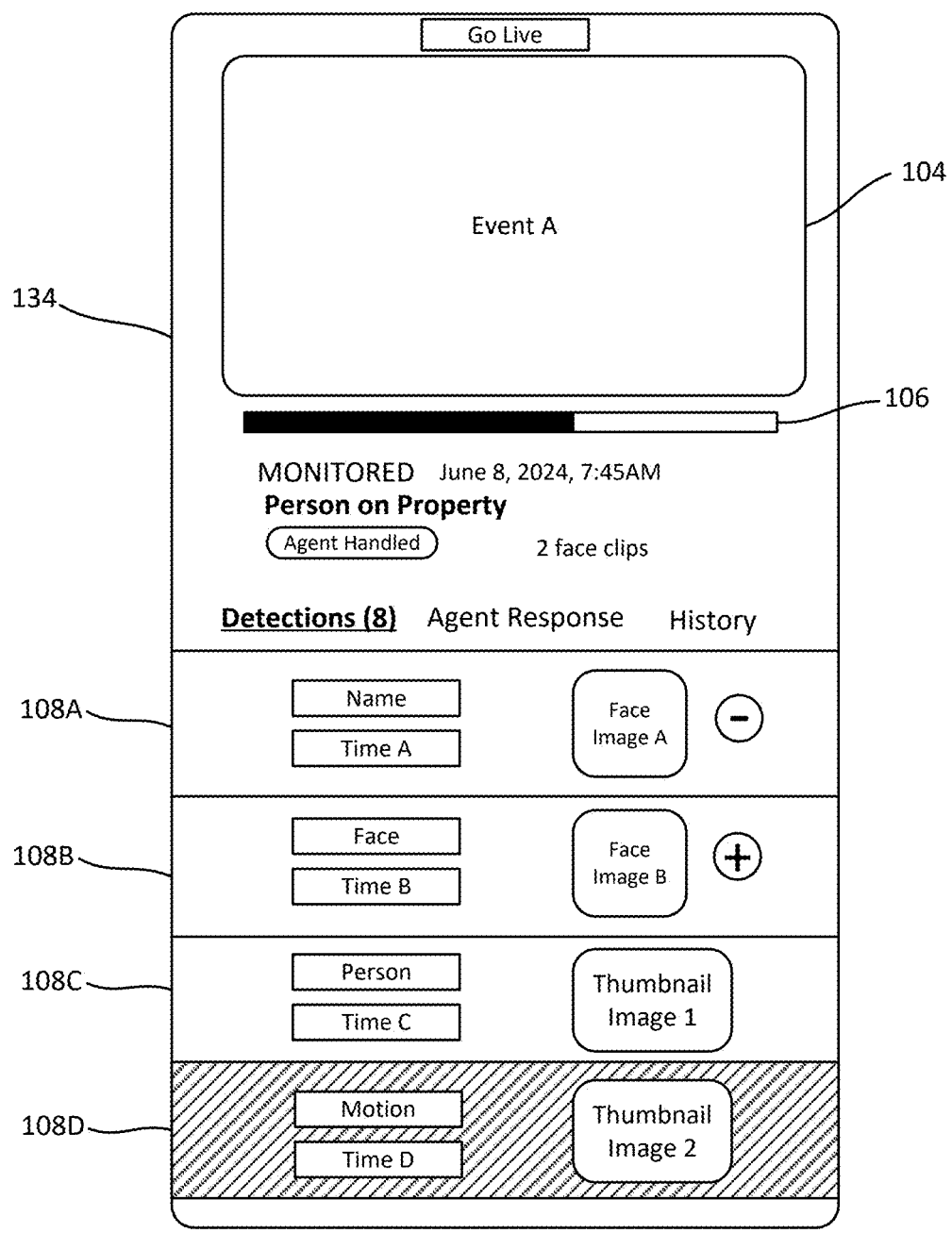
FIG. 1B shows a second example screen that may be presented on a user device to display event records generated by a security system, according to some implementations of the present disclosure.

With reference to the example screen 102 shown in FIG. 1A, when the application 228 determines that the video being played back in the video playback window 104 has reached a frame corresponding to the thumbnail image 122B, the application 228 may then cause the detection UI element 108C to cease being highlighted or otherwise indicated and instead cause the detection UI element 108D to be highlighted or otherwise indicated, thus apprising the user 216 viewing recorded video in the video playback window 104 that the video has reached a frame in which the feature represented by the detection UI element 108D was detected. This state of the detection UI elements 108C and 108D, i.e., where the detection UI element 108D is highlighted or otherwise indicated and the detection UI element 108C has ceased being highlighted or otherwise indicated, is reflected on the example screen 134 shown in FIG. 1B. It can also be noted that, in FIG. 1B, the position of the progress bar 106 on the screen 134 indicates that playback of the video within the video playback window 104 has progressed beyond the temporal position of FIG. 1A.

Figure 1C:
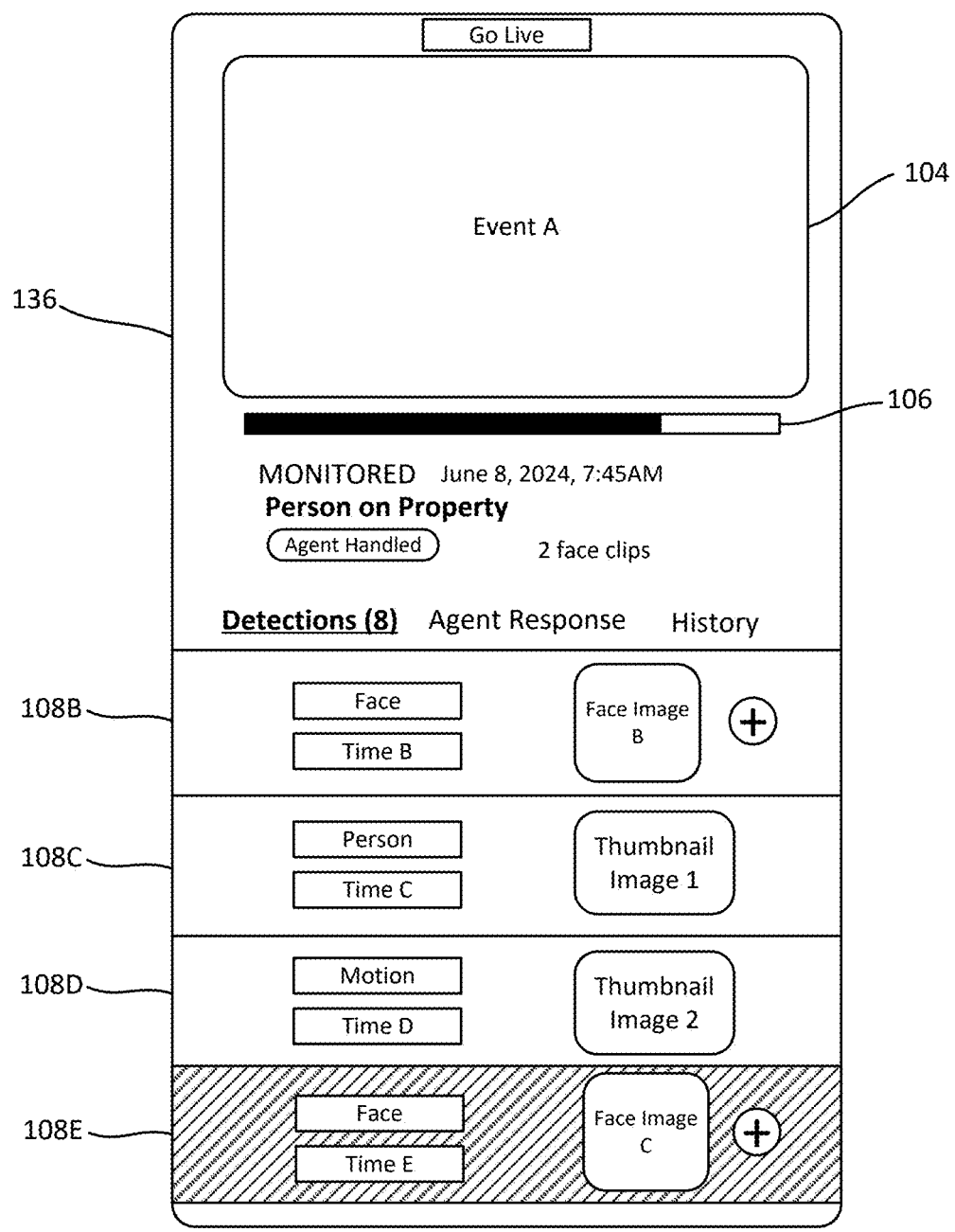
FIG. 1C shows a third example screen that may be presented on a user device to display event records generated by a security system, according to some implementations of the present disclosure.

Subsequently, when the application 228 determines that the video being played back in the video playback window 104 has reached a frame corresponding to a detection UI element following (i.e., positioned below) the detection UI element 108D (e.g., see detection element 180E shown in FIG. 1C), the application 228 may then both (A) cause the list of detection UI elements 108 to shift upwards to reveal the next detection UI element 108E in the list, and (B) cause the detection UI element 108D to cease being highlighted or otherwise indicated and instead cause the newly-revealed detection UI element 108E to be highlighted or otherwise indicated, thus apprising the user 216 viewing recorded video in the video playback window 104 that the video has reached a frame in which the feature of the next detection UI element 108E in the list was detected. It can also be noted that, in FIG. 1C, the position of the progress bar 106 on the screen 136 indicates that playback of the video within the video playback window 104 has progressed even further beyond the temporal position of FIG. 1A.

In some implementations, the application 228 may be configured to refrain from scrolling automatically to reveal another detection UI element 108 as video playback continues, as just described, in response to determining that the user 216 has engaged in one or more particular interactions with UI elements on the screen 102. For example, in response to determining that the user 216 has scrolled the list of detection UI elements 108 manually, e.g., by dragging a finger upwards or downwards on the list, the application 228 may disable the automated scrolling functionality for at least a brief period of time, thus allowing the user 216 to take exclusive control of the scrolling function to achieve some objective, such as manually scrolling to reveal a detection UI element 108 including a face image 120 and selecting a UI element 124 to associate or dissociate that face image 120 with a visitor profile.

As yet another feature, as shown in FIG. 1A, in some implementations the application 228 may cause the screen 102 to present a UI element 128 that, when selected by a user 216, may cause the application 228 receive and present in the video playback window 104 real-time, or near real-time, streaming video from a camera 202 at the monitored location 204, such as by using WebRTC functionality to establish a peer-to-peer connection between the camera 202 and the application 228.

Figure 2:
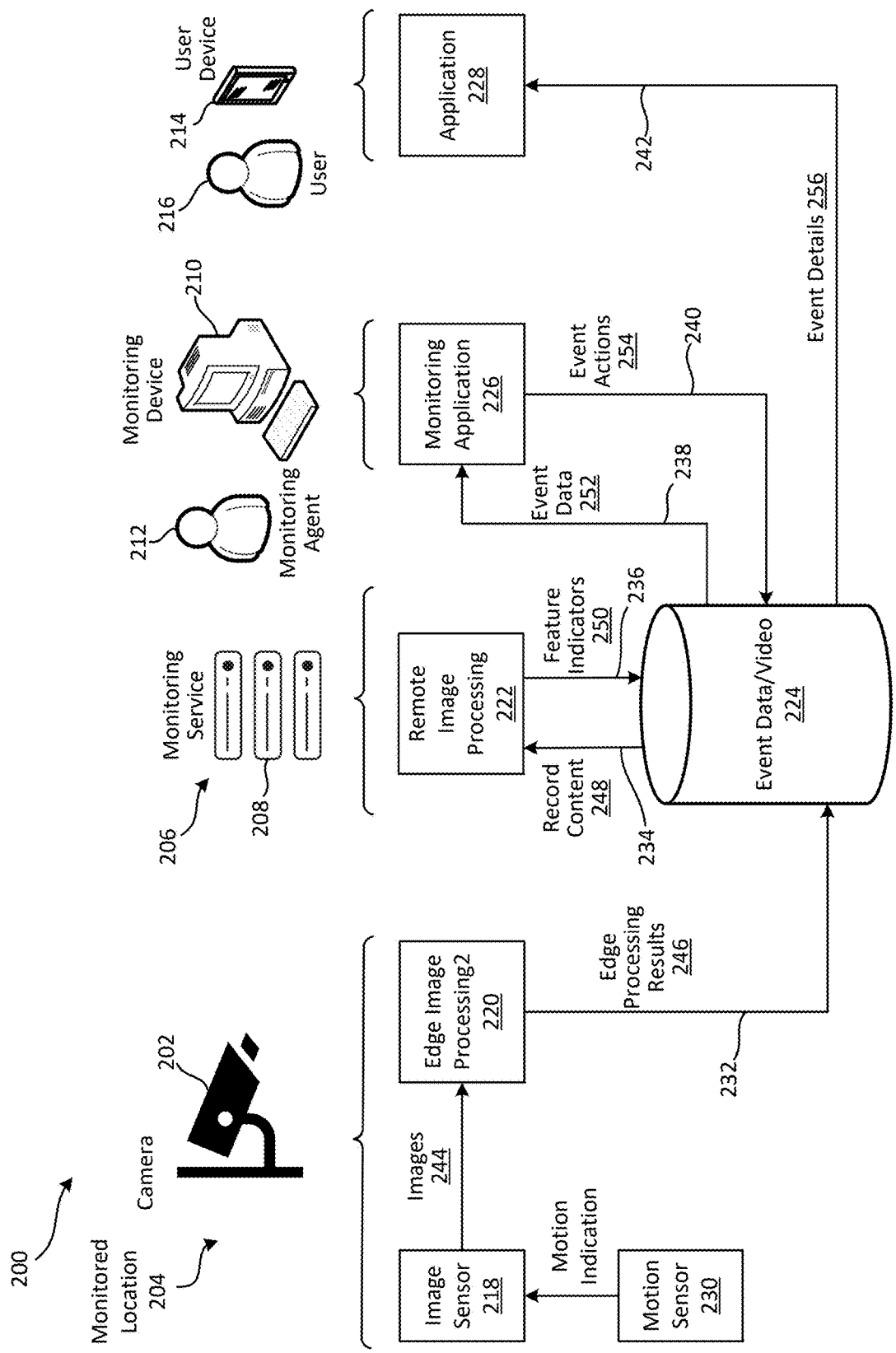
FIG. 2 shows example components of a security system configured in accordance with some embodiments of the present disclosure as well as example interactions or data flows that may take place amongst such components.

FIG. 2 shows example components of a security system 200 configured in accordance with some embodiments of the present disclosure as well as example interactions or data flows that may take place amongst such components. As shown, in addition to the application 228 and user device 214 that, as described above in connection with FIG. 1A, may be used to present the screen 102, the security system 200 may include one or more cameras 202 disposed at a monitored location 204 (e.g., a residence, business, parking lot, etc.), a monitoring service 206 (e.g., including one or more servers 208) located remote from the camera(s) 202 (e.g., within a cloud-based service such as the surveillance center environment 826 described below in connection with FIG. 8), one or more monitoring devices 210 operated by respective monitoring agents 212. An example computing system 900 that may be used to implement any of the computer-based components disclosed herein, e.g., the camera 202, the server(s) 208, the monitoring device(s) 210, and/or the user device(s) 214 is described below in connection with FIG. 9). Although not illustrated in FIG. 2, it should be appreciated the various illustrated components may communicate with one another via one or more networks, e.g., the internet.

As shown in FIG. 2, a camera 202 may include, among other components, a motion sensor 230, an image sensor 218, and an edge image processing component 220. In some implementations, the camera 202 may include one or more processors and one or more computer-readable mediums, and the one or more computer-readable mediums may be encoded with instruction which, when executed by the one or more processors, cause the camera 202 to implement some or all of the functionality of the edge image processing component 220 described herein. As also shown in FIG. 2, the monitoring service 206 may include, among other components, a remote image processing component 222. In some implementations, the server(s) 208 of the monitoring service 206 may include one or more processors and one or more computer-readable mediums, and the one or more computer-readable mediums may be encoded with instruction which, when executed by the one or more processors, cause the server(s) 208 to implement some or all of the functionality of the remote image processing component 222 described herein.

As indicated by arrows 232, 234, 236, 238, 240, and 242 in FIG. 2, the edge image processing component 220, the remote image processing component 222, the monitoring application 226, and the application 228, may be in communication with the event/video datastore(s) 224, e.g., via one or more networks, such as the network 820 described below in connection with FIG. 8). In some implementations, the monitoring service 206 or another component within the surveillance center environment 826 (see FIG. 8) may provide one or more application programming interfaces (APIs) that can be used by the edge image processing component 220, the remote image processing component 222, the monitoring application 226, and the application 228 to write data to the event/video datastore(s) 224 and/or fetch data from the event/video datastore(s) 224, as needed.

As illustrated in FIG. 2, the image sensor 218 may acquire images 244 (e.g., digital data representing one or more acquired frames of pixel values) from the monitored location 204 and pass such images 244 to the edge image processing component 220 for processing. In some implementations, for example, the motion sensor 230 may detect motion at the monitored location 204 and provide a signal to the image sensor 218. The motion sensor 230 may, for example, be a passive infrared (PIR) sensor. In response to receiving a signal from the motion sensor 230, the image sensor 218 may begin acquiring frames of images 244 of a scene within the camera's field of view. In some implementations, the image sensor 218 may continue collecting frames of images 244 until no motion is detected by the motion sensor 230 for a threshold period of time (e.g., twenty seconds). As a result, the images 244 acquired by the image sensor 218 may be a video clip of a scene within the camera's field of view that begins when motion was first detected and ends after motion has ceased for the threshold period of time.

In some implementations, rather than relying upon a motion sensor 230 (e.g., a PIR sensor) to trigger the collection of frames of images 244, the camera 202 may instead continuously collect frames of images 244 and rely upon one or more image processors (e.g., machine learning (ML) models and/or other computer vision (CV) processing components) of the edge image processing component 220 to process the collected frames to detect motion within the field of view of the camera 202. Accordingly, in such implementations, rather than relying upon a motion indication provided by a motion sensor 230 to determine the start and end of a video clip for further processing, the camera 202 may instead rely upon a motion indication provided by such image processor(s) for that purpose.

In some implementations, the edge image processing component 220 may include one or more image processors (e.g., ML models and/or other CV processing components) to identify features (e.g., motion, persons, objects, etc.) within the images 244, and the remote image processing component 222 may include one or more different image processors (e.g., ML models and/or other CV processing components) to identify features within the images 244. The image processors may, for example, process images 244 to detect motion, to identify people, to identify faces, to identify objects, to perform facial recognition, etc. In some implementations, the processing power of the server(s) 208 employed by the monitoring service 206 may be significantly greater than that of the processor(s) included in the edge image processing component 220, thus allowing the monitoring service 206 to employ more complex image processors and/or to execute a larger number of such image processors in parallel.

As shown in FIG. 2, the edge image processing component 220 may generate edge processing results 246 corresponding to one or more identified features of the images 244 (and, optionally, the images 244 themselves) and may send the edge processing results 246 to the event/video datastore(s) 224 so as to cause the event/video datastore(s) 224 to generate a new record for a particular event (e.g., by creating a new row within a table 402—described below in connection with FIG. 4A) and store data for the event within that record. Although not shown in FIG. 2, it should be appreciated that, in some implementations, the edge image processing component 220 may additionally or alternatively send the edge processing results 246 directly to the remote image processing component 222 for processing, so that the remote image processing component 222 need not wait for a new record to be created in the event/video datastore(s) 224 to begin analyzing the edge processing results 246. In some implementations, the edge processing results 246 may include metadata for the event, such as an identifier for the event, a timestamp representing when the event occurred, an identifier for a user who resides at or otherwise has permission to enter the monitored location 204, an identifier for the monitored location 204, an identifier for the camera 202 that captured the images 244, etc.

As noted above, in some implementations, the event/video datastore(s) 224 may include the table 402 (see FIG. 4A) that includes rows of data representing records of respective detected events. Individual columns of the table 402 may represent an item or piece of data or metadata associated with the record represented in the corresponding row (e.g., a unique identifier for the event, a timestamp for the event, images for the event and/or a pointer to a location at which images for the event are stored, an identifier of a monitored location 204 to which the record relates, an identifier of a user who resides at or otherwise has permission to enter the monitored location 204, an identifier of a camera 202 that captured the images for the event, etc. In some implementations, the table 402 may represent a compilation of records for a large number of events detected by the security system 200, including records that need to be assigned to monitoring agents 212 for review, records that have been assigned to monitoring agents 212 for review, and records that have been handled/canceled by monitoring agents 212 or as a result of automated processing performed by the security system 200. Additional details concerning the example table 402 are described below in connection with FIG. 4A.

FIG. 3 is a flowchart of an example routine 300 for that may be executed by the application 228 shown in FIG. 2 to implement the functionality of the screen 102 described above in connection with FIG. 1A, in accordance with some aspects of the present disclosure.

At step 302 of the routine 300, an application of a computing device may provide a user interface (UI), e.g., the screen 102, to (i) play back video within a first region of a screen, e.g., the video playback window 104, and (ii) to display a plurality of interactive elements, e.g., the detection UI elements 108, corresponding to features detected in the video, the plurality of interactive elements being displayed in a second region of the screen different from the first region.

At step 304 of the routine 300, the application 228 may determine that play back of the video has reached a first temporal position in the video, e.g., a position corresponding to a time offset 436 (described below in connection with FIG. 4B), that corresponds to a first interactive element of the plurality of interactive elements displayed in the second region.

At step 306 of the routine 300, the application 228 may cause a change in an appearance of the first interactive element (e.g., the detection UI element 108C shown in FIG. 1A) to visually distinguish the first interactive element from others of plurality of interactive elements (e.g., the detection UI elements 108A, 108B and 108D shown in FIG. 1A), the change being temporary so that upon advancement of play back of the video beyond the first temporal position, e.g., when the playback reaches a temporal position corresponding to another detection UI element 108, the appearance of the first interactive element reverts back to the appearance as displayed before the first temporal position in the video was reached.

FIG. 4A shows an example table or data structure of events 402 that may be used to store the records for various events detected by the security system 200. As shown, for individual events, the table 402 may be populated with data representing, among other things, an event identifier (ID) 404, a timestamp 406, a user ID 408, a location ID 410, a camera ID 412, images 414, a first frame time 416, feature indicators 418, an event status 420, and an event disposition 422. The nature of these entries and the manner in which they may be used by the application 228 and other components of the security system 200 to implement the functionality outlined above in connection with FIG. 1A is described in more detail below.

The event IDs 404 may identify the different events that the security system 200 has detected, and the data in the same row as a given event ID 404 may correspond to that same event.

The event timestamps 406 may indicate times at which the corresponding events were detected. In some implementations, the application 228 may use the event timestamps 406 to populate a date and time indicator 130 on the screen 102 of a user device 214, as illustrated in FIG. 1A.

The user IDs 408 may represent the users to whom the detected events relate (e.g., the user who resides at or otherwise has permission to enter a monitored location 204 at which an event was detected). In some implementations, the application 228 may use the user IDs 408 to identify one or more event records in the event table 402 that are available for review by the user 216. For example, in some implementations, the application 228 may present the screen 102 for a particular event in response to the user 216 selecting a UI element representing that event record from a group of UI elements representing various event records that are available for review by the user 216.

The location IDs 410 may identify the monitored locations (e.g., the monitored location 204) at which the events were detected. In some implementations, the application 228 may use the location IDs 410 to populate a location indicator (not illustrated) on the screen 102 of a user device 214, such as by indicating that the event in question was detected at a primary home of the user 216, a vacation house of the user 216, etc.

The camera IDs 412 may represent the cameras (e.g., the camera 202) that recorded one or more images of the detected events. In some implementations, the application 228 may use the camera ID 412 in an event record to identify the camera with which the application 228 is to establish a connection (e.g., a peer-to-peer connection) to enable receipt of a real-time, or near real-time, video feed in response to selection of the UI element 128 on the screen 102, as described above.

The images 414 may represent one or more images (e.g., snapshots or video streams) that were acquired by the cameras (e.g., the images 244 acquired by the camera 202 shown in FIG. 2) identified with the camera IDs 412 when the events were detected and/or may represent one or more images created using such acquired images, such as by cropping an acquired image including a detected face to generate a face image 120 and/or annotating an acquired image (e.g., by overlaying the acquired image with a red or other prominently colored rectangle about an element) to identify particular features (e.g., faces, people, weapons, etc.). In some implementations, the images 414 entries in the table 402 may include objects containing links or pointers to such image(s).

The first frame time 416 may be a timestamp indicating a time of day at which a first frame of a video for an event was recorded. In some implementations, the first frame time 416 may be slightly offset from the event timestamp 406, such as when there a slight delay between event detection and the beginning of video recording. In some implementations, the remote image processing component 222 may use the first frame time 416 to calculate a time offset 436 (see FIG. 4B) between a time of day at which a video frame including a detected feature (e.g., motion, a person, a face, a weapon, etc.) was recorded and the first frame time 416. As described in more detail below, in some implementations, the application 228 may use such a time offset 436 (e.g., a number of seconds) to determine whether and when to highlight or otherwise indicate a particular detection UI element 108 on the screen 102 during playback of a recorded video within the video playback window 104 and/or to determine a location within such a recorded video to which to jump in response to the user 216 selecting one of the detection UI elements 108.

The feature indicators 418 may include information concerning one or more features identified in the images 414 for a record, e.g., features identified by the edge image processing component 220 and/or the remote image processing component 222, and/or one or more features identified by a monitoring agent 212 during review of an event record via a monitoring application 226. Such information may include, for example, indicators of motion detected in the images 414, indicators of people detected in the images 414, indicators of faces detected in the images 414, indicators of weapons detected in the images 414, etc. An example data structure including feature indicators 418 for an event record is described below in connection with FIG. 4B.

The event statuses 420 may represent the state of the security system's processing with respect to individual records. For example, an event status 420 for a record may indicate that the record is active and in need of further processing (e.g., "new"), is awaiting review by a monitoring agent 212 (e.g., "assigned"), is being actively being reviewed by a monitoring agent 212 (e.g., "reviewing"), has been marked as "canceled" or "handled" (e.g., by a monitoring agent 212 or automatically by a component of the security system 200), has "expired," has resulted in emergency "dispatch" services, and/or is on "hold" (e.g., has been grouped with a similar, related record that is currently being reviewed by a monitoring agent 212).

In some implementations, the event statuses 420 may additionally or alternatively indicate whether the corresponding event was actively monitored by a monitoring agent 212, e.g., such as by reviewing event data 252 and taking one or more actions 254 relating to an event, as described in more detail below with reference to FIG. 2. In such implementations, the application 228 may use the event statuses 420 to populate a monitored status indicator 132 on the screen 102 of a user device 214, such as by showing a status of "MONITORED," e.g., as illustrated in FIG. 1A, to indicate that the event in question was actively monitored by a monitoring agent 212.

The event dispositions 422 may represent the disposition of the incident in question following review by one or more monitoring agents 212 and/or a user 216, such as that the incident was an "emergency" situation (e.g., when a life threatening or violent situation took place) or an "urgent" situation (e.g., package theft, property damage, or vandalism), that the incident was "handled" by the monitoring agent 212, that the police or fire department was "dispatched" to address the incident, that review of the incident was "canceled" after a person accurately provided a safe word or other identifying information, that review of the incident was "canceled" by the user 216 (e.g., via the application 228), etc. In some implementations, the noted event dispositions 422 may be used, for example, to determine whether to send a notification (e.g., a push notification, SMS message, email, etc.) to the user, whether to tag the record for review by the user, whether to include the record in a list of to-be-reviewed records in response to a user query specifying one or more filtering criteria, etc.

Although not illustrated in FIG. 4A, it should be appreciated that the table 402 may additionally include other data that can be used for various purposes, such as an indication of the geographic location/coordinates of the monitored location 204, descriptions of the records (e.g., "Back Yard Camera Detected Motion"), actions taken by monitoring agents 212 while reviewing information corresponding to records, one or more recorded audio tracks for the record, status changes of one or more sensors (e.g., door lock sensors) at monitored locations 204, etc.

Referring once again to FIG. 2, similar to the edge image processing component 220, the remote image processing component 222 may perform processing on the images 244 (or portions of the images 244, e.g., one or more frames identified by the edge image processing component 220) acquired by the camera 202 to identify one or more features.

In some implementations, the processing performed by one or more of the image processors of the edge image processing component 220 may be used to inform and/or enhance the processing that is performed by one or more of the image processors of the remote image processing component 222.

As one example, one or more of the image processors of the edge image processing component 220 may perform initial processing to identity key frames within the images that potentially represent motion, people, faces, etc., and one or more of the image processors of the remote image processing component 222 may perform additional processing only on the key frames that were identified by the one or more image processors of the edge image processing component 220. As another example, one or more of the image processors of the edge image processing component 220 may perform processing on the images to identity particular frames that include motion, and one or more of the image processors of the remote image processing component 222 may perform processing to detect people only on the particular frames that were identified by the one or more image processors of the edge image processing component 220. As yet another example, one or more of the image processors of the edge image processing component 220 may perform processing on the images to identity particular frames that include images of people, and one or more of the image processors of the remote image processing component 222 may perform processing to detect and/or recognize faces only on the particular frames that were identified by the one or more image processors of the edge image processing component 220. As still another example, one or more of the image processors of the edge image processing component 220 may perform processing on the images to identity particular frames that include images of faces, and one or more of the image processors of the remote image processing component 222 may perform processing to perform enhanced face recognition and/or recognize faces only on the particular frames that were identified by the one or more image processors of the edge image processing component 220. Further, in some implementations, the remote image processing component 222 may itself perform processing using multiple different image processing models, where certain of the image processors are dependent on the results obtained by one or more other image processors.

In some implementations, the remote image processing component 222 may be a software application that is executed by one or more processors of the monitoring service 206. For example, as noted above, in some implementations, the server(s) 208 of the monitoring service 206 (see FIG. 2) may include one or more computer-readable mediums encoded with instructions which, when executed by one or more processors of the server(s) 208, cause the server(s) 208 to implement the functionality of the remote image processing component 222 described herein.

As shown in FIG. 2, the remote image processing component 222 may receive content 248 of a record stored in the event/video datastore(s) 224 (e.g., some or all of the data from a row of the table 402). The content 248 may include, for example, one or more images (e.g., still images and/or video) or pointers to one or more locations at which such image(s) are stored, and possibly other data from the record, such as an identifier for the record, indicators of identified features within images for the record, a timestamp representing when an event was detected, an identifier for a user who resides at or otherwise has permission to enter the monitored location 204, an identifier for the monitored location 204, an identifier for the camera 202 that captured the images, etc. In some implementations, the remote image processing component 222 may retrieve the content 248 in response to receiving an indication or otherwise determining that a record stored in the event/video datastore(s) 224 has been added or modified. For example, the remote image processing component 222 may receive such an indication (e.g., from the event/video datastore(s) 224, an event handler, or the edge image processing component 220) any time one or more images 414 are added to or modified for a record.

In some implementations, the remote image processing component 222 may further receive contextual data from one or more contextual datastores (not illustrated). Such contextual data may include, for example, information from one or more profiles corresponding to the monitored location 204 and/or a user, and such information may be used to enhance or improve the processing performed by the remote image processing component 222. As one example, the contextual data may include one or more biometric embeddings for known individuals (e.g., corresponding to visitor profiles created for such individuals) that may be used, for example, to perform facial recognition processing.

The remote image processing component 222 may process the images (and possibly other data) included within, or pointed to by, the content 248 received from the event/video datastore(s) 224 (and optionally, the contextual data received from the contextual datastore(s)) to detect and/or confirm the presence of one or more features (e.g., motion, people, faces, recognized faces, etc.) within such images. The remote image processing component 222 may generate one or more indicators 250 corresponding to the identified feature(s) and cause such indicator(s) 250 to be added to the record for the event, e.g., by writing them to the row of the table 402 corresponding to the event (e.g., as feature indicators 418).

Example information that may be included within the feature indicators 418 for an individual record in the table 402 e.g., based on the indicators 250 received from the remote image processing component 222 or otherwise, is shown in tabular format in FIG. 4B, as a data object or table 430. In some implementations, the information shown in FIG. 4B may be stored as a data object within the table 402, e.g., as the entry "FI1" of the feature indicators 418 shown in FIG. 4A. As shown in FIG. 4B, such a data object may describe one or more features detected in respective video frames for a detected event, and may include, for example, a feature type 432, a feature image pointer 434, a time offset 436, and feature metadata 438. In some implementations, the application 228 may use the information in such a data object to generate a scrollable list of detection UI elements 108, such as those shown in FIG. 1A. For example, individual rows of the table 430 shown in FIG. 4B may include information corresponding to respective detection UI elements 108 that are to be included within such a scrollable list. With respect to the example screen 102 shown in FIG. 1A, since the UI element 110 indicates that a total of "8" detection UI elements 108 are available for review by the user 216, the table/data object 430 for the detected event being reviewed via the screen 102 may include eight rows of information.

The feature types 432 may indicate the types of features that were detected (e.g., "motion," "person," "recognized face," "unrecognized face," "weapon," etc.) by the edge image processing component 220, the remote image processing component 222, and or a monitoring agent 212 via a monitoring application 226. In some implementations, the application 228 may use the feature types 432 to determine the information to include in the detection type indicators 116 shown in FIG. 1A.

The feature image pointers 434 may identify the locations at which images for the detected features (e.g., face images 120, thumbnail images 122, etc.) are stored. In some implementations, the application 228 may use the feature image pointers 434 to identify and retrieve the images (e.g., face images 120, thumbnail images 122, etc.) that are to be included in the respective detection UI elements 108.

The time offsets 436 may represent calculated amounts of time (e.g., a number of seconds) between the first frame time 416 (e.g., a timestamp indicating a time of day at which a first frame of a video for a detected event was recorded) and the times of day at which the video frames including the features in question were recorded. As noted above, in some implementations, the remote image processing component 222 may determine the time offset 436 for a detected feature by calculating a difference between a timestamp indicating a time of day at which a video frame including the detected feature (e.g., motion, a person, a face, a weapon, etc.) was recorded and the first frame time 416. In some implementations, the application 228 may use such time offsets 436 to determine the value of the respective time markers 118 represented on the detection UI elements 108, e.g., by adding the time offsets 436 for the detected features to the first frame time 416 to determine the approximate times of day at which the video frames including the detected features were recorded.

In some implementations, the application 228 may additionally or alternatively use the time offsets 436 to determine whether and when to highlight or otherwise indicate particular detection UI elements 108 on the screen 102 during playback of a recorded video within the video playback window 104 and/or to determine locations within such a recorded video to which to jump in response to the user 216 selecting respective ones of the detection UI elements 108. For example, while the application 228 is playing back a recorded video within the video playback window 104, the application 228 may track the relative temporal position of the currently displayed video frame with respect to the first frame of the recorded video (e.g., by using the same playback counter value that is used to update the progress bar 106) to identify occasions on which that temporal position matches a time offset 436, and, in response to identifying such a match, may cause the corresponding detection UI element 108 to be highlighted or otherwise indicated on the screen 102 and also cause another detection UI element 108 that was previously highlighted or otherwise indicated (if another detection UI element was previously indicated) to cease being highlighted or otherwise indicated.

Additionally or alternatively, in response to the application 228 determining that the user 216 has selected one of the detection UI elements 108 on the screen 102, the application 228 may cause the video being played back in the video playback window 104 to jump to a video frame located at a temporal position (e.g., determined using the same playback counter value that is used to update the progress bar 106) matching the time offset 436 for the selected detection UI element 108. In some implementations, the time offset 436 may be set to be a slightly lower value (e.g., 2-3 seconds less than) the actual time difference calculated as described above, so as to cause the detection UI element 108 for a detected feature to be highlighted or otherwise indicated shortly before the video frame including the detected feature is reached during playback of a recorded video within the video playback window 104 and/or to cause the video being played back in the video playback window 104 to jump to a temporal position shortly prior to (e.g., 2-3 seconds earlier than) a video frame including a detected feature in response to a user input selecting a detection UI element 108 for that feature.

The feature metadata 438 may represent additional information about a detected feature, such as a person's name that is to be displayed within a detection type indicator 116 for a recognized face, e.g., the detection type indicator 116A shown in FIG. 1A.

Figure 5:
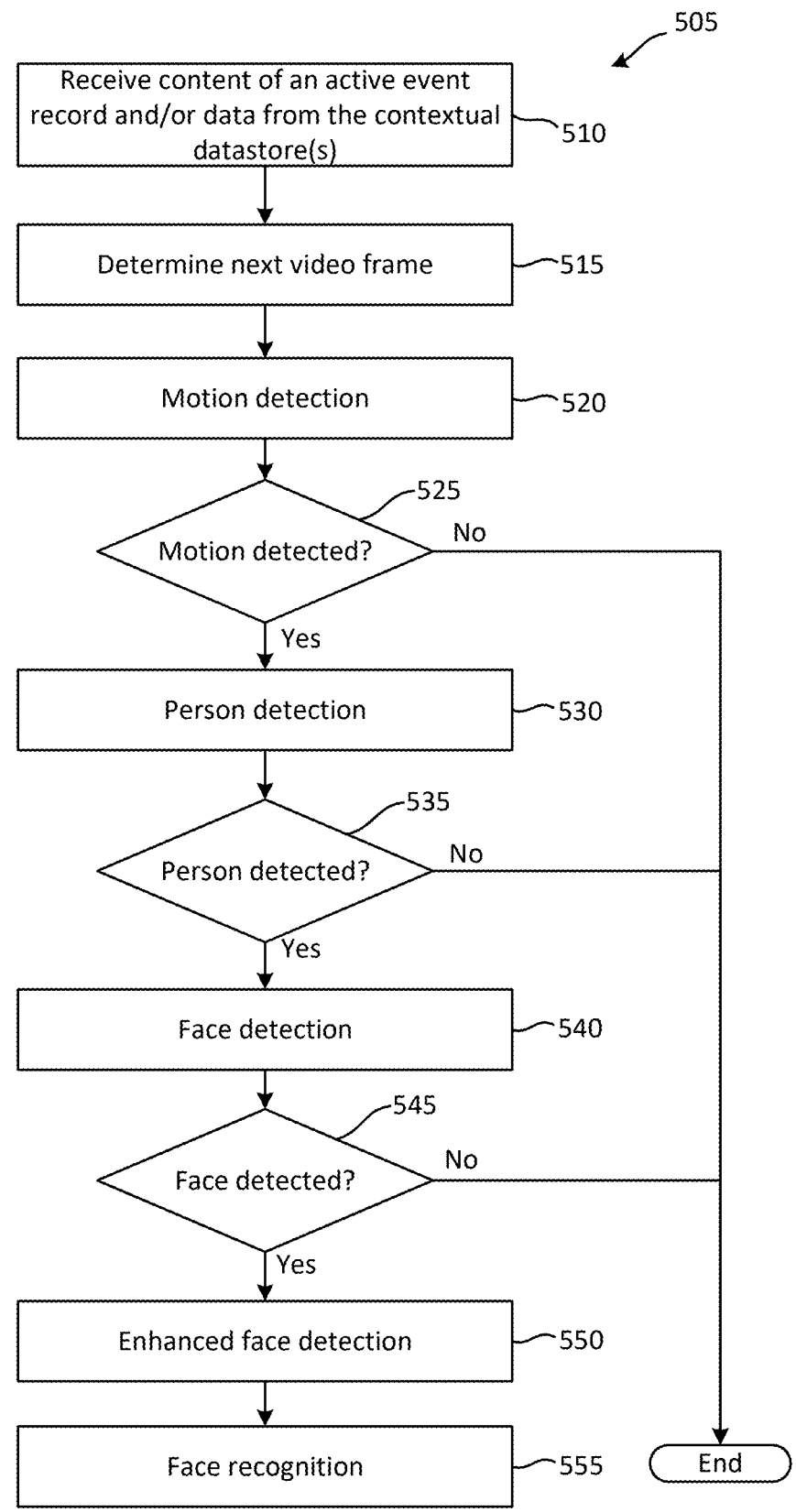
FIG. 5 is a flow chart showing an example process that may be employed by the remote image processing component shown in FIG. 2, according to some implementations of the present disclosure.

FIG. 5 is a flow chart showing an example process 505 that may be employed by the remote image processing component 222 to perform image processing in accordance with some implementations of the present disclosure. As shown in FIG. 5, the process 505 may begin at a step 510, at which the remote image processing component 222 may receive content 248 from a record (e.g., an active record) within the event/video datastore(s) 224 and may optionally also receive data (e.g., contextual data) from a contextual datastore(s) (not illustrated). In some implementations, a record in the table 402 may be considered "active" if it has an event status 420 of "new," "assigned," "reviewing," or "hold." The remote image processing component 222 may identify active records in need of processing in any of numerous ways and may, for instance, retrieve the content 248 and/or contextual data in response to receiving a notification or otherwise determining that the content 248 and/or contextual data has changed in a potentially relevant way.

At a step 515, the remote image processing component 222 may determine a next frame of recorded video that is included within, or pointed to by, the content 248 received from the event/video datastore(s) 224. In some implementations, for example, the content 248 may include, or point to, a sequence of frames of video, and the remote image processing component 222 may process those frames, or perhaps some subset of the frames (e.g., every tenth frame), in sequence, with the "next frame" determined at the step 515 corresponding to the next unprocessed frame in the sequence of frames.

At a step 520 of the process 505, the remote image processing component 222 may, for example, cause one or more first image processors to perform processing on the frame (and perhaps one or more adjacent or nearby frames) to determine whether the frame corresponds to a moving object. In some implementations, for example, motion may be detected by using one or more functions of the OpenCV library (accessible at the uniform resource locator (URL) "opencv.org") to detect a difference between frames that indicates an object represented in the frames was motion. When, at the step 520, the remote image processing component 222 determines that a frame includes an object that was in motion when the frame was acquired, the remote image processing component 222 may generate a feature indicator 418 indicative of the detected motion, and cause that feature indicator 418 to be added to the record for the event.

Per a decision 525, if the remote image processing component 222 determines that the frame does not correspond to a moving object, the process 505 may terminate. If, on the other hand, the remote image processing component 222 determines (at the decision 525) that the frame does correspond to a moving object, the process 505 may instead proceed to a step 530, at which the remote image processing component 222 may cause one or more second image processors to perform processing on the frame to determine whether the frame includes a person. One example of an ML model that may be used for person detection is YOLO (accessible via the URL "github.com"). When, at the step 530, the remote image processing component 222 determines that a frame includes a person, the remote image processing component 222 may generate a feature indicator 418 indicative of the detected person, and cause that feature indicator 418 to be added to the record for the event.

Per a decision 535, if the remote image processing component 222 determines that the frame does not include a person, the process 505 may terminate. If, on the other hand, the remote image processing component 222 determines (at the decision 535) that the frame does include a person, the process 505 may instead proceed to a step 540, at which the remote image processing component 222 may cause one or more third image processors to perform processing on the frame to determine whether the frame includes a face. One example of an ML model that may be used for face detection is RetinaFace (accessible via the URL "github.com"). When, at the step 540, the remote image processing component 222 determines that a frame includes a face, the remote image processing component 222 may generate a feature indicator 418 indicative of the detected face, and cause that feature indicator 418 to be added to the record for the event.

Per a decision 545, if the remote image processing component 222 determines that the frame does not include a face, the process 505 may terminate. If, on the other hand, the remote image processing component 222 determines (at the decision 545) that the frame does include a face, the process 505 may instead proceed to a step 550, at which the remote image processing component 222 may cause one or more fourth image processors to perform enhanced facial recognition processes to more accurately identify and locate the face in the frame. One example of an ML model that may be used for enhanced face detection is MTCNN_face_detection_alignment (accessible via the URL "github.com"). The remote image processing component 222 may then generate a new feature indicator 418 indicative of the results of the enhanced face detection, and cause that feature indicator 418 to be added to the record for the event, and/or may modify the feature indicator generated at the step 540 to include such a result.

Finally, the process 505 may proceed to a step 555, at which the remote image processing component 222 may perform facial recognition on the face detected in the frame, such as by generating biometric embeddings of the detected face and comparing those embeddings against a library of known faces to attempt to determine an identity of the person based on the identified face. One example of an ML model that may be used for facial recognition is AdaFace (accessible via the URL "github.com"). When, at the step 555, the remote image processing component 222 determines that a known face is represented in the frame, the remote image processing component 222 may generate a feature indicator 418 indicative of the recognized face, and cause that feature indicator 418 to be added to the record for the event. As noted above, in some implementations, such a feature indicator 418 for a recognized face may include feature metadata 438 indicating a name of the identified person.

It should be appreciated that, in some implementations, rather than performing image processing (e.g., shown in FIG. 5), the edge image processing component 220 and/or the remote image processing component 222 may instead use one or more ML models and/or other computer vision (CV) processing components to perform image processing of the types described, or perhaps other types of image processing to identify one or more other feature types, in parallel or partially in parallel. In such implementations, the edge image processing component 220 and/or the remote image processing component 222 may generate feature indicators 418 indicative of the features detected by the respective components, and cause such feature indicators 418 to be added to records, as soon as they are generated by the respective ML models and/or other computer vision (CV) processing components. Additionally, as noted above, in some implementations, the edge image processing results received from the edge image processing component 220 may be used to enhance the image processing that is performed by the remote image processing component 222, such as by identifying one or more key frames that are to be further processed by the remote image processing component 222.

In some implementations, notifications concerning "actionable" events represented in the event table 402 (e.g., events for which the remote image processing component 222 identified one or more features of interest) may be dispatched to respective monitoring applications 226 for review by monitoring agents 212. In some implementations, the monitoring service 206 may use the contents of the event table 402 to assign individual events to various monitoring agents 212 who are currently on-line with monitoring applications 226. As shown in FIG. 2, in some implementations, a monitoring application 226 operated by the monitoring agent 212 to whom an event record has been assigned for review may receive event data 252 for the event record to be reviewed and may cause the monitoring device 210 to present various user interface screens based on that event data that allow the monitoring agent 212 to determine whether the event represents an actual security concern, as opposed to an innocuous situation, such as by reviewing recorded video for the event, evaluating the accuracy of one or more feature detections made by the edge image processing component 220 and/or the remote image processing component 222, reviewing real-time, or near real-time, video from the monitored location and possibly communicating (e.g., via a speaker and microphone of the camera 202) with a person at the monitored location 204, etc. During and/or following such review, the monitoring application 226 may communicate event actions 254 to the event data/video datastore(s) 224 based on one or more inputs provided by the monitoring agent 212 to such user interface screens, thus causing certain information in the table 402 (e.g., the event status 420 and/or the event disposition 422) to be updated. As noted above, in some implementations, the application 228 may cause the user device 214 to present a list of event records that are available for review by the user 216, and the application 228 may cause the user device 214 to present the screen 102 in response to the user's selection of one of those event records. In some implementations, the event records that are presented on such a list of "reviewable" event records may be determined based, at least in part, on the values of the event status 420 and/or event disposition 422 entries in the table 402.

As shown in FIG. 2, in some implementations, the application 228 may receive event details 256 from the event data/video datastore(s) 224 to, among other things, present the screen 102 shown in FIG. 1A. An example routine 600 that may be performed by the application 228, using such event details 256, will now be described with reference to FIG. 6.

Figure 6:
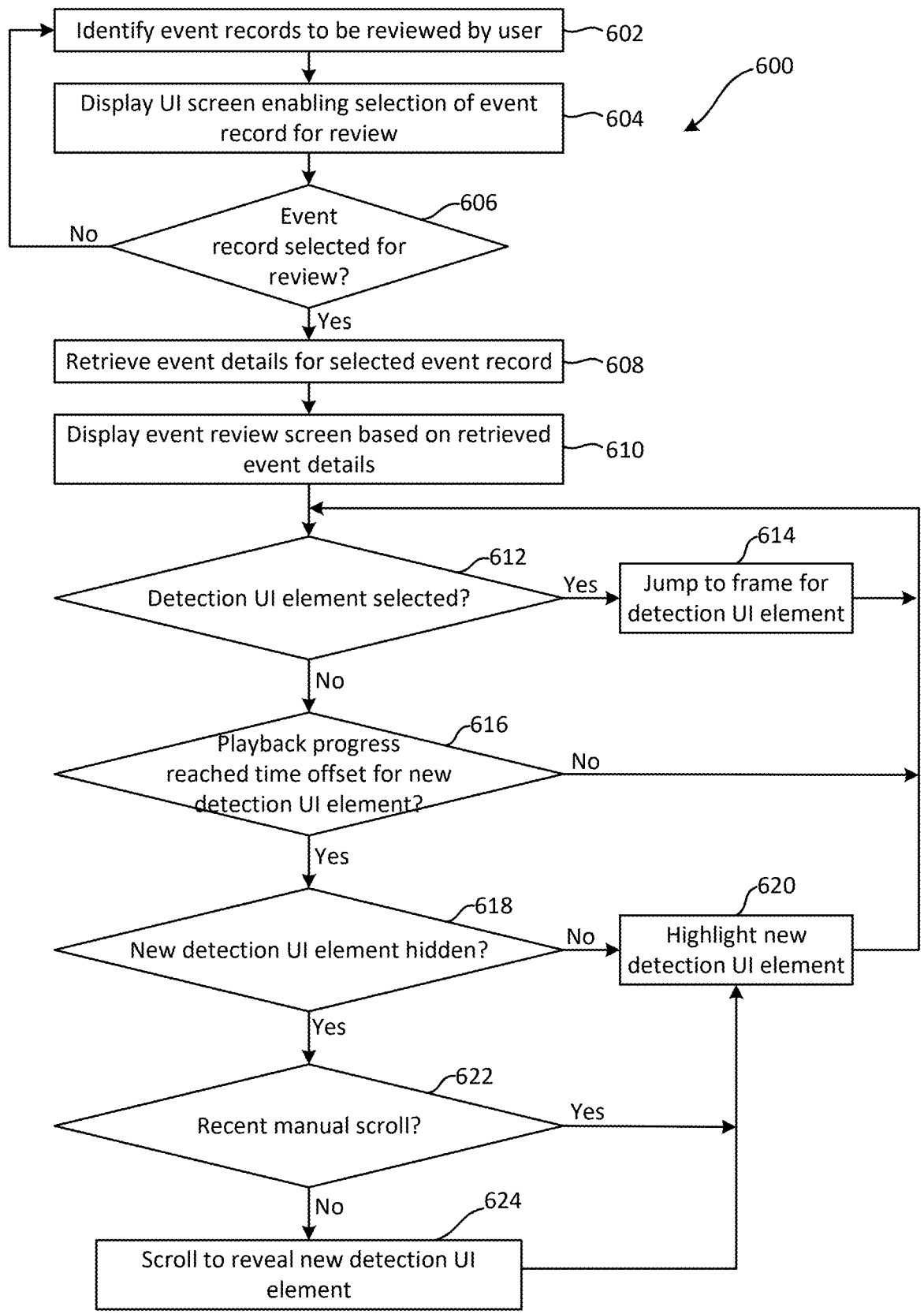
FIG. 6 shows an example routine that may be performed by a application to implement certain functionality of the screens shown in FIGS. 1A-1C, according to some implementations of the present disclosure.

As shown in FIG. 6, the routine 600 may begin at a step 602, at which the application 228 may identify one or more event records in the table 402 that are available for review by the user 216. In some implementations, for example, certain of the event records may be marked as being available for review by the user 216, e.g., based on user preferences indicating types of events and/or types of event dispositions the user 216 desires to review.

At a step 604 of the routine 600, the application 228 may display a UI screen (not illustrated) that enables the user to select a particular event record to review, such as by presenting a plurality of selectable UI elements for respective event records. In some implementations, the application 228 may provide one or more additional UI elements that allow the user 216 to filter and/or sort the event records that are available to review (e.g., based on property location, e.g., if the user 216 has multiple properties monitored by the security system 200, based on date and/or time, based on event type, based on event disposition, based on features identified in the video acquired for the event, and/or based on any other criterion using the entries in the table 402 for the event record).

At a decision 606 of the routine 600, the application 228 may determine (e.g., by monitoring touch inputs provided to a touch screen of the user device 214) whether an event record has been selected via the UI screen presented pursuant to the step 604. As indicated, the application 228 may continue (per the steps 602 and 604) to identify and enable the selection of new event records that become available for review by the user 216 until the application 228 determines (at the decision 606) that the user 216 has selected a particular event record to review.

When, at the decision 606, the application 228 determines that an event record has been selected for review, the routine 600 may proceed to a step 608, at which the application 228 may retrieve the event details 256 (see FIG. 2) for the selected record from the event data/video datastore(s) 224, thus enabling the application 228 to present detection UI elements 108 together with recorded video for the event, such as via the screen 102 shown in FIG. 1A, to enable a user 216 to quickly navigate to portions of a record video that are of particular interest. The information from the table 402 that may be used to populate and render the various elements on the screen 102 are described above in connection with FIGS. 4A and 4B.

Figure 7:
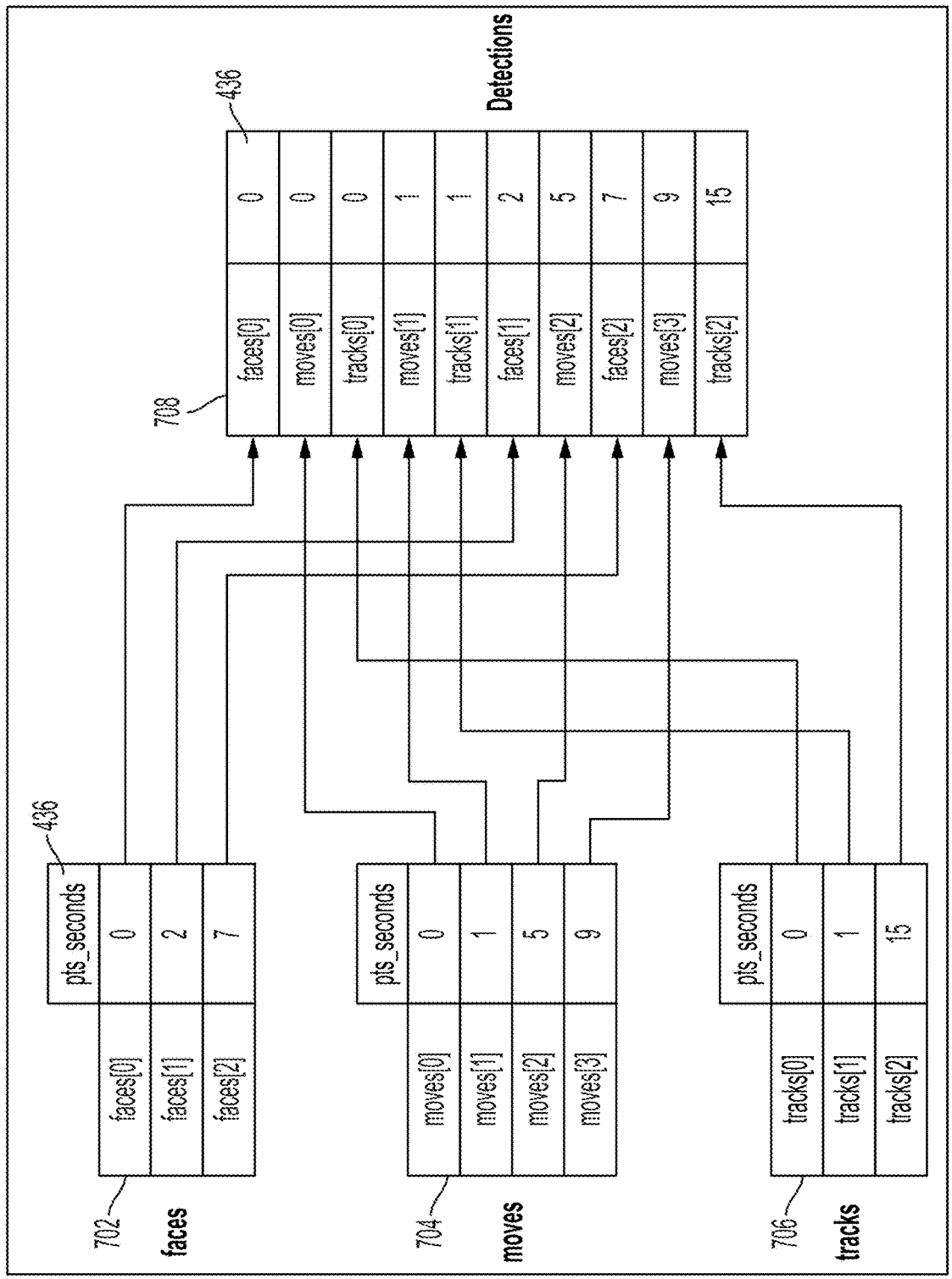
FIG. 7 illustrates how lists of features detected in a recorded video may be merged and sorted, according to some implementations of the present disclosure.

In some implementations, the event details 256 received by the application 228 may include metadata describing detections of multiple different features (e.g., faces, motion, and people) within the recorded video for the selected event, with respective feature types being described in separate lists of detections metadata. For example, as shown on the left-hand side of FIG. 7, the event details 256 received by the application 228 may include a first list 702 of detections for faces, a second list 704 of detections for motion (indicated as "Moves" in FIG. 7), and a third list 706 of detections of people (indicated as "tracks" in FIG. 7). In some implementations, the individual entries on the lists 702, 704, 706 may correspond to the data in the respective rows of the table 430 shown in FIG. 4B. As shown in FIG. 7, the individual items on the lists 702, 704, 706 may include, among other metadata, time offsets 436 (indicated as "pts_seconds" in FIG. 7) of the type described above in connection with FIG. 4B.

Referring again to FIG. 6, at a step 610 of the routine 600, the application 228 may use the retrieved event details 256 to render a screen, e.g., the screen 102 shown in FIG. 1A. In some implementations, as shown on the right-hand side of FIG. 7, the application 228 may merge the lists 702, 704, 706 of detections received from the event/video datastore(s) 224 to generate a combined list 708 of detections and may sort the combined list 708 chronologically using the values of the time offsets 436. The application 228 may thus create creates a list of the individual features that were detected in the video recording organized chronologically in the order they appear in the video. After merging and sorting the lists 702, 704, 706 in this manner, application 228 may use the combined list 708 to present the detection UI elements 108 within the region of the screen 102 below the video playback window 104, as a visible and scannable vertical list of chronologically ordered detection UI elements 108, such as illustrated in FIG. 1A.

When the screen 102 is first presented by the application 228, the application 228 may cause the recorded video for the event to begin being played back in the video playback window 104, starting from the first (in time) recorded frame of the video, and the application 228 may also cause the first several detection UI elements 108 for the event (e.g., the detection UI elements 108A-108D in FIG. 1A) to be presented on the screen 102, together with the UI element 110 indicating the total number of detection UI elements (e.g., "8" detection UI elements) that have been created for the event record. The selection of the detection UI elements 108 to present initially on the screen 102 when the video playback begins may be based on the time offsets 436 within the combined list 708, such as by selecting the four entries on the combined list 708 that have the lowest time offsets 436. In some implementations, if no features were identified in the first several video frames (e.g., by the edge image processing component 220 and/or the remote image processing component 222), then none of the displayed detection UI elements 108 would be highlighted or otherwise indicated when the recorded video first begins playing. At the beginning of video playback, the progress bar 106 would also indicate that the recorded video has just begun to play.

At a decision 612 of the routine 600, the application 228 may determine (e.g., by monitoring touch inputs provided to a touch screen of the user device 214) whether one of the displayed detection UI elements 108 has been selected by the user 216 (e.g., by touching it with a finger).

When the application 228 determines (at the decision 612) that one of the detection UI elements 108 has been selected, the routine 600 may proceed to a step 614, at which the application 228 may cause the recorded video being played back in the video playback window 104 to jump to a position corresponding to the time offset 436 for that detection UI element, such as by instructing a video player application on the user device 214 that is handling playback of the video within the video playback window 104 to jump to such a position. As noted above, the time offset 436 for a detection UI element 108 may represent an amount of time (e.g., a number of seconds) between the first frame of the video and the frame of the recorded video in which the feature for the detection UI element 108 (e.g., motion, a person, a recognized face, an unrecognized face, a weapon, etc.) was detected. When the application 228 causes the played back video to jump in this fashion, the application 228 may also cause the progress bar 106 to be updated to indicate the relative position of the newly displayed video frame (e.g., the video frame in which the feature of the selected detection UI element 108 was detected) relative to the entire sequence of video frames for the recorded video for the event under review. Following the step 614, the routine may return to the decision 612.

When, at the decision 612, the application 228 determines that the user 216 has not selected a detection UI element 108, the routine 600 may proceed to a decision 616, at which the application 228 may determine (e.g., based on data received from video player application on the user device 214 that is handling playback of the video within the video playback window 104) whether the progress of the video playback (e.g., the temporal position of the current frame relative to the first video frame, such as indicated by the progress bar 106) has reached the time offset 436 indicated in the combined list 708 for a new detection UI element 108. As noted above, in some implementations, the application 228 may selectively pause or resume the playback of recorded video in the video playback window 104 in response to input by the user 216, such as by toggling between a "play" state and a "pause" state in response to the user 216 touching the video playback window 104.

When, at the decision 616, the application 228 determines that the progress of the video playback has not reached the time offset 436 for a new detection UI element 108, the routine 600 may return to the decision 612. When, on the other hand, the application 228 determines that the progress of the video playback has reached the time offset 436 for a new detection UI element 108, the routine 600 may proceed to a decision 618, at which the application 228 may determine (e.g., by evaluating which detection UI elements 108 are currently displayed on the screen 102) whether the new detection UI element in question is "hidden," e.g., is not currently visible on the screen 102. For instance, in the example screen 102 shown in FIG. 1A, only four of the eight detection UI elements 108 available for review are visible on the screen 102 at a given time. As indicated above, however, the list of detection UI element 108 can be scrolled, either manually or automatically, to reveal the other "hidden" detection UI elements 108.

When, at the decision 618, the application 228 determines (e.g., by evaluating which detection UI elements 108 are currently displayed on the screen 102) that the new detection UI element (identified per the decision 616) is not currently hidden, the routine 600 may proceed to a step 620, at which the application 228 may cause the identified detection UI element 108 to be highlighted or otherwise indicated. In the example shown in FIG. 1A, for instance, the detection UI element 108C has been highlighted. At the same time, also at the step 620, the application 228 may remove the highlighting or other indication from another detection UI element 108 if the step 620 had been previously performed with respect to a different detection UI element 108.

When, on the other hand, the application 228 determines (per the decision 618) that the new detection UI element is currently hidden, the routine 600 may proceed to a decision 622, at which the application 228 may determine (e.g., by tracking the user's interactions with the screen 102 over time) whether the user 216 recently (e.g., within the preceding five seconds) manually scrolled the list of detection UI elements 108. The application 228 may make such a determination, for example, so that it may refrain from automatically scrolling the list of detection UI elements 108 (as described below) in a circumstance in which the user 216 is exercising control over the scrolling operation for some purpose, e.g., to determine whether to take actions with respect to face images 120, such as by selecting UI elements 124 to make adjustments to visitor profiles.

When, at the decision 622, the application 228 determines (e.g., by tracking the user's interactions with the screen 102 over time) that the user 216 has not recently manually scrolled the list of detection UI elements 108, the application 228 may proceed to a step 624, at which the application 228 may scroll the list of detection UI elements 108 to reveal the new detection UI element (identified per the decision 616). For instance, referring to FIG. 1A, if the detection UI element 108D was highlighted at the time the step 624 was reached, the application 228 may scroll the list of detection UI elements 108 to reveal the "hidden" detection UI element 108 located immediately below the detection UI element 108D. After scrolling the list of detection UI elements 108 (per the step 624) to reveal the new detection UI element (identified per the decision 616), the routine may proceed to the step 620, at which the new detection UI element may be highlighted or otherwise indicated, as described above.

When, at the decision 622, the application 228 determines that the user 216 has recently (e.g., within the previous five seconds) manually scrolled the list of detection UI elements 108, the application 228 may proceed directly to the step 620, at which the new detection UI element may highlighted or otherwise indicated (even though it is currently hidden), thus ensuring that the correct detection UI element 108 is highlighted or otherwise indicated (based on video playback progress) in case the user 216 continues manually scrolling the list of detection UI elements 108 to reveal the newly-highlighted detection UI element 108.

Figure 8:
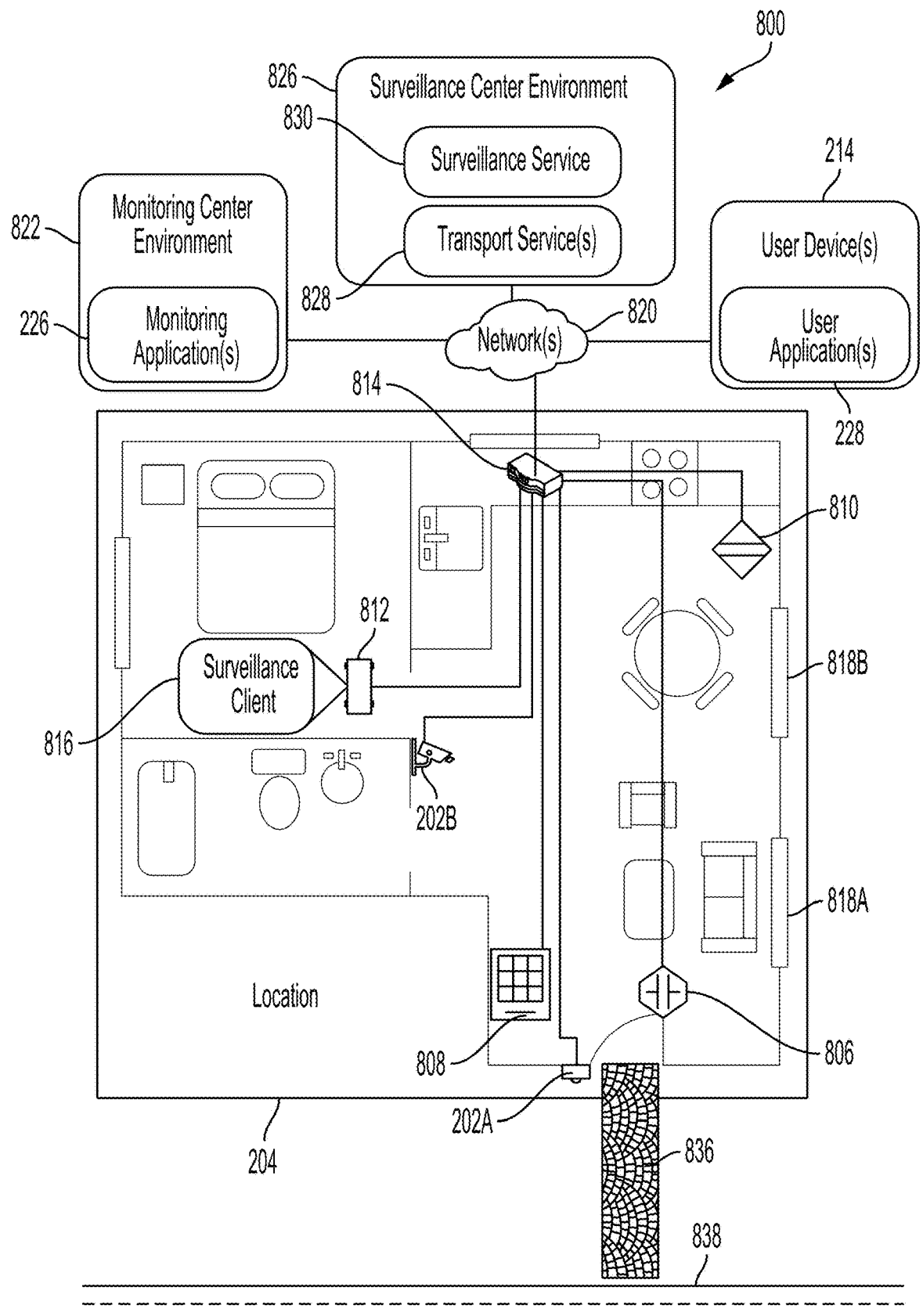
FIG. 8 is a schematic diagram of an example security system with which various aspects of the present disclosure may be employed.

FIG. 8 is a schematic diagram of an example security system 800 with which various aspects of the present disclosure may be employed. As shown, in some implementations, the security system 800 may include a plurality of monitored locations 204 (only one of which is illustrated in FIG. 8), a monitoring center environment 822, a surveillance center environment 826, one or more user devices 214, and one or more communication networks 820. The monitored location 204, the monitoring center environment 822, the surveillance center environment 826, the one or more user devices 214, and the communication network(s) 820 may each include one or more computing devices (e.g., as described below with reference to FIG. 9). The user device(s) 214 may include one or more applications 228, e.g., as applications hosted on or otherwise accessible by the user device(s) 214. In some implementations, the applications 228 may be embodied as web applications that can be accessed via browsers of the user device(s) 214. The monitoring center environment 822 may include one or more monitoring applications 226, e.g., as applications hosted on or otherwise accessible to computing devices within the monitoring center environment 822. In some implementations, the monitoring applications 226 may be embodied as web applications that can be accessed via browsers of computing devices operated by monitoring agents 212 within the monitoring center environment 822. The surveillance center environment 826 may include a surveillance service 830 and one or more transport services 828.

As shown in FIG. 8, the monitored location 204 may include one or more image capture devices (e.g., cameras 202A and 202B), one or more contact sensor assemblies (e.g., contact sensor assembly 806), one or more keypads (e.g., keypad 808), one or more motion sensor assemblies (e.g., motion sensor assembly 810), a base station 812, and a router 814. As illustrated, the base station 812 may host a surveillance client 816.

In some implementations, the router 814 may be a wireless router that is configured to communicate with the devices disposed at the monitored location 204 (e.g., devices 202A, 202B, 806, 808, 810, and 812) via communications that comport with a communications standard such as any of the various Institute of Electrical and Electronics Engineers (IEEE) 308.11 standards. As illustrated in FIG. 8, the router 814 may also be configured to communicate with the network(s) 820. In some implementations, the router 814 may implement a local area network (LAN) within and proximate to the monitored location 204. In other implementations, other types of networking technologies may additionally or alternatively be used within the monitored location 204. For instance, in some implementations, the base station 812 may receive and forward communication packets transmitted by one or both of the cameras 202A, 202B via a point-to-point personal area network (PAN) protocol, such as BLUETOOTH. Other suitable wired, wireless, and mesh network technologies and topologies will be apparent with the benefit of this disclosure and are intended to fall within the scope of the examples disclosed herein.

The network(s) 820 may include one or more public and/or private networks that support, for example, internet protocol (IP) communications. The network(s) 820 may include, for example, one or more LANs, one or more PANs, and/or one or more wide area networks (WANs). LANs that may be employed include wired or wireless networks that support various LAN standards, such as a version of IEEE 308.11 or the like. PANs that may be employed include wired or wireless networks that support various PAN standards, such as BLUETOOTH, ZIGBEE, or the like. WANs that may be employed include wired or wireless networks that support various WAN standards, such as Code Division Multiple Access (CMDA), Global System for Mobiles (GSM), or the like. Regardless of the particular networking technology that is employed, the network(s) 820 may connect and enable data communication among the components within the monitored location 204, the monitoring center environment 822, the surveillance center environment 826, and the user device(s) 214. In at least some implementations, both the monitoring center environment 822 and the surveillance center environment 826 may include networking components (e.g., similar to the router 814) that are configured to communicate with the network(s) 820 and various computing devices within those environments.

The surveillance center environment 826 may include physical space, communications, cooling, and power infrastructure to support networked operation of a large number of computing devices. For instance, the infrastructure of the surveillance center environment 826 may include rack space into which the computing devices may be installed, uninterruptible power supplies, cooling plenum and equipment, and networking devices. The surveillance center environment 826 may be dedicated to the security system 800, may be a non-dedicated, commercially available cloud computing service (e.g., MICROSOFT AZURE, AMAZON WEB SERVICES, GOOGLE CLOUD, or the like), or may include a hybrid configuration made up of both dedicated and non-dedicated resources. Regardless of its physical or logical configuration, as shown in FIG. 8, the surveillance center environment 826 may be configured to host the surveillance service 830 and the transport service(s) 828.

The monitoring center environment 822 may include a plurality of computing devices (e.g., desktop computers) and network equipment (e.g., one or more routers) that enable communication between the computing devices and the network(s) 820. The user device(s) 214 may each include a personal computing device (e.g., a desktop computer, laptop, tablet, smartphone, or the like) and network equipment (e.g., a router, cellular modem, cellular radio, or the like). As illustrated in FIG. 8, the monitoring center environment 822 may be configured to host the monitoring application(s) 226 and the user device(s) 214 may be configured to host the application(s) 228.

The devices 202A, 202B, 806, and 810 may be configured to acquire analog signals via sensors incorporated into the devices, generate digital sensor data based on the acquired signals, and communicate (e.g., via a wireless link with the router 814) the sensor data to the base station 812 and/or one or more components within the surveillance center environment 826 (e.g., the remote image processing component 222 described above). The types of sensor data generated and communicated by these devices may vary depending on the characteristics of the sensors they include. For instance, the image capture devices or cameras 202A and 202B may acquire ambient light, generate one or more frames of image data based on the acquired light, and communicate the frame(s) to the base station 812 and/or one or more components within the surveillance center environment 826, although the pixel resolution and frame rate may vary depending on the capabilities of the devices. In some implementations, the cameras 202A and 202B may also receive and store filter zone configuration data and filter the frame(s) using one or more filter zones (e.g., areas within the FOV of a camera from which image data is to be redacted for various reasons, such as to exclude a tree that is likely to generate a false positive motion detection result on a windy day) prior to communicating the frame(s) to the base station 812 and/or one or more components within the surveillance center environment 826. In the example shown in FIG. 8, the camera 202A has a field of view (FOV) that originates proximal to a front door of the monitored location 204 and can acquire images of a walkway 836, a road 838, and a space between the monitored location 204 and the road 838. The camera 202B, on the other hand, has an FOV that originates proximal to a bathroom of the monitored location 204 and can acquire images of a living room and dining area of the monitored location 204. The camera 202B may further acquire images of outdoor areas beyond the monitored location 204, e.g., through windows 818A and 818B on the right-hand side of the monitored location 204.

Individual sensor assemblies deployed at the monitored location 204, e.g., the contact sensor assembly 806 shown in FIG. 8, may include, for example, a sensor that can detect the presence of a magnetic field generated by a magnet when the magnet is proximal to the sensor. When the magnetic field is present, the contact sensor assembly 806 may generate Boolean sensor data specifying a closed state of a window, door, etc. When the magnetic field is absent, the contact sensor assembly 806 may instead generate Boolean sensor data specifying an open state of the window, door, etc. In either case, the contact sensor assembly 806 shown in FIG. 8 may communicate sensor data indicating whether the front door of the monitored location 204 is open or closed to the base station 812.

Individual motion sensor assemblies that are deployed at the monitored location 204, e.g., the motion sensor assembly 810 shown in FIG. 8, may include, for example, a component that can emit high-frequency pressure waves (e.g., ultrasonic waves) and a sensor that can acquire reflections of the emitted waves. When the sensor detects a change in the reflected pressure waves, e.g., because one or more objects are moving within the space monitored by the sensor, the motion sensor assembly 810 may generate Boolean sensor data specifying an alert state. When the sensor does not detect a change in the reflected pressure waves, e.g., because no objects are moving within the monitored space, the motion sensor assembly 810 may instead generate Boolean sensor data specifying a still state. In either case, the motion sensor assembly 810 may communicate the sensor data to the base station 812. It should be noted that the specific sensing modalities described above are not limiting to the present disclosure. For instance, as but one example of an alternative implementation, the motion sensor assembly 810 may instead (or additionally) base its operation on the detection of changes in reflected electromagnetic waves.

While particular types of sensors are described above, it should be appreciated that other types of sensors may additionally or alternatively be employed within the monitored location 204 to detect the presence and/or movement of humans, or other conditions of interest, such as smoke, elevated carbon dioxide levels, water accumulation, etc., and to communicate data indicative of such conditions to the base station 812. For instance, although not illustrated in FIG. 8, in some implementations, one or more sensors may be employed to detect sudden changes in a measured temperature, sudden changes in incident infrared radiation, sudden changes in incident pressure waves (e.g., sound waves), etc. Still further, in some implementations, some such sensors and/or the base station 812 may additionally or alternatively be configured to identify particular signal profiles indicative of particular conditions, such as sound profiles indicative of breaking glass, footsteps, coughing, etc.

The keypad 808 shown in FIG. 8 may be configured to interact with a user and interoperate with the other devices disposed in the monitored location 204 in response to such interactions. For instance, in some examples, the keypad 808 may be configured to receive input from a user that specifies one or more commands and to communicate the specified commands to one or more addressed devices and/or processes, e.g., one or more of the devices disposed in the monitored location 204, the monitoring application(s) 226, and/or the surveillance service 830. The communicated commands may include, for example, codes that authenticate the user as a resident of the monitored location 204 and/or codes that request activation or deactivation of one or more of the devices disposed in the monitored location 204. In some implementations, the keypad 808 may include a user interface (e.g., a tactile interface, such as a set of physical buttons or a set of "soft" buttons on a touchscreen) configured to interact with a user (e.g., receive input from and/or render output to the user). Further, in some implementations, the keypad 808 may receive responses to the communicated commands and render such responses via the user interface as visual or audio output.

The base station 812 shown in FIG. 8 may be configured to interoperate with other security system devices disposed at the monitored location 204 to provide local command and control and/or store-and-forward functionality via execution of the surveillance client 816. To implement local command and control functionality, the base station 812 may execute a variety of programmatic operations through execution of the surveillance client 816 in response to various events. Examples of such events include reception of commands from the keypad 808, reception of commands from one of the monitoring application(s) 226 or the application 228 via the network(s) 820, and detection of the occurrence of a scheduled event. The programmatic operations executed by the base station 812 via execution of the surveillance client 816 in response to events may include, for example, activation or deactivation of one or more of the devices 202A, 202B, 806, 808, and 810; sounding of an alarm; reporting an event to the surveillance service 830; and/or communicating "location data" to one or more of the transport service(s) 828. Such location data may include, for example, data specifying sensor readings (sensor data), image data acquired by one or more cameras 202, configuration data of one or more of the devices disposed at the monitored location 204, commands input and received from a user (e.g., via the keypad 808 or a application 228), or data derived from one or more of the foregoing data types (e.g., filtered sensor data, filtered image data, summarizations of sensor data, data specifying an event detected at the monitored location 204 via the sensor data, etc.).

In some implementations, to implement store-and-forward functionality, the base station 812, through execution of the surveillance client 816, may receive sensor data, package the data for transport, and store the packaged sensor data in local memory for subsequent communication. Such communication of the packaged sensor data may include, for example, transmission of the packaged sensor data as a payload of a message to one or more of the transport service(s) 828 when a communication link to the transport service(s) 828 via the network(s) 820 is operational. In some implementations, such packaging of the sensor data may include filtering the sensor data using one or more filter zones and/or generating one or more summaries (maximum values, average values, changes in values since the previous communication of the same, etc.) of multiple sensor readings.

The transport service(s) 828 of the surveillance center environment 826 may be configured to receive messages from monitored locations (e.g., the monitored location 204), parse the messages to extract payloads included therein, and store the payloads and/or data derived from the payloads within one or more data stores hosted in the surveillance center environment 826. Examples of such data stores are described below in connection with FIG. 9. In some implementations, the transport service(s) 828 may expose and implement one or more application programming interfaces (APIs) that are configured to receive, process, and respond to calls from base stations (e.g., the base station 812) via the network(s) 820. Individual instances of transport service(s) 828 may be associated with and specific to certain manufactures and/or models of location-based monitoring equipment (e.g., SIMPLISAFE equipment, RING equipment, etc.).

The API(s) of the transport service(s) 828 may be implemented using a variety of architectural styles and interoperability standards. For instance, in some implementations, one or more such APIs may include a web services interface implemented using a representational state transfer (REST) architectural style. In such implementations, API calls may be encoded using the Hypertext Transfer Protocol (HTTP) along with JavaScript Object Notation (JSON) and/or an extensible markup language. Such API calls may be addressed to one or more uniform resource locators (URLs) corresponding to API endpoints monitored by the transport service(s) 828. In some implementations, portions of the HTTP communications may be encrypted to increase security. Alternatively (or additionally), in some implementations, one or more APIs of the transport service(s) 828 may be implemented as a .NET web API that responds to HTTP posts to particular URLs. Alternatively (or additionally), in some implementations, one or more APIs of the transport service(s) 828 may be implemented using simple file transfer protocol commands. Thus, the API(s) of the transport service(s) 828 are not limited to any particular implementation.

The surveillance service 830 within the surveillance center environment 826 may be configured to control the overall logical setup and operation of the security system 800. As such, the surveillance service 830 may communicate and interoperate with the transport service(s) 828, the monitoring application(s) 226, the application(s) 228, and the various devices disposed at the monitored location 204 via the network(s) 820. In some implementations, the surveillance service 830 may be configured to monitor data from a variety of sources for events (e.g., a break-in event) and, when an event is detected, notify one or more of the monitoring applications 226 and/or the application(s) 228 of the event.

In some implementations, the surveillance service 830 may additionally be configured to maintain state information regarding the monitored location 204. Such state information may indicate, for example, whether the monitored location 204 is safe or under threat. In some implementations, the surveillance service 830 may be configured to change the state information to indicate that the monitored location 204 is safe only upon receipt of a communication indicating a clear event (e.g., rather than making such a change solely due to the lack of additional events being detected). This feature can prevent a "crash and smash" robbery (e.g., where an intruder promptly destroys or disables monitoring equipment) from being successfully executed. In addition, in some implementations, the surveillance service 830 may be configured to monitor one or more particular zones within the monitored location 204, such as one or more particular rooms or other distinct regions within and/or around the monitored location 204 and/or one or more defined regions within the FOVs of the respective image capture devices deployed in the monitored location (e.g., the cameras 202A and 202B shown in FIG. 8).

The individual monitoring application(s) 226 of the monitoring center environment 822 may be configured to enable monitoring personnel to interact with respective computing devices to provide monitoring services for respective locations (e.g., the monitored location 204), and to execute a variety of programmatic operations in response to such interactions. For example, in some implementations, a monitoring application 226 may control its host computing device to provide information regarding events detected at monitored locations, such as the monitored location 204, to a person operating that computing device. Such events may include, for example, detected movement within a particular zone of the monitored location 204. In some implementations, the monitoring application 226 may cause a monitoring device 210 to present video of events within individual event windows of a screen, and may further establish a streaming connection with one or more cameras 202 at the monitored location and cause the monitoring device 210 to provide streamed video from such camera(s) 202 within the main viewer window and/or the secondary viewer windows of a screen, as well as to allow audio communication between the monitoring device 210 and the camera(s) 202. Such a streaming connection may be established, for example, using web real-time communication (WebRTC) functionality of a browser on the monitoring device 210.

The application(s) 228 of the user device(s) 214 may be configured to enable users to interact with their computing devices (e.g., their smartphones or personal computers) to access various services provided by the security system 800 for their individual homes or other locations (e.g., the monitored location 204), and to execute a variety of programmatic operations in response to such interactions. For example, in some implementations, an application 228 may control a user device 214 (e.g., a smartphone or personal computer) to provide information regarding events detected at monitored locations, such as the monitored location 204, to the user operating that user device 214. Such events may include, for example, detected movement within a particular zone of the monitored location 204. In some implementations, the application 228 may additionally or alternatively be configured to process input received from the user to activate or deactivate one or more of the devices disposed within the monitored location 204. Further, the application 228 may additionally or alternatively be configured to establish a streaming connection with one or more cameras 202 at the monitored location and cause the user device 214 to display streamed video from such camera(s) 202, as well as to allow audio communication between the user device 214 and the camera(s) 202. Such a streaming connection may be established, for example, using web real-time communication (WebRTC) functionality of a browser on the user device 214.

Figure 9:
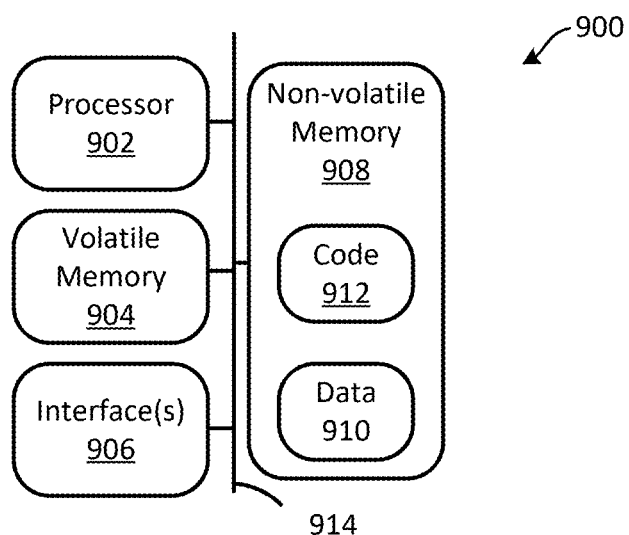
FIG. 9 is a schematic diagram of a computing device that may be used to implement a user device, a monitoring device, and/or one or more of the services of the of the security system disclosed herein, according to some implementations of the present disclosure.

Turning now to FIG. 9, a computing system 900 is illustrated schematically. As shown in FIG. 9, the computing system 900 may include at least one processor 902, volatile memory 904, one or more interfaces 906, non-volatile memory 908, and an interconnection mechanism 914. The non-volatile memory 908 may include executable code 910 and, as illustrated, may additionally include at least one data store 912.

In some implementations, the non-volatile (non-transitory) memory 908 may include one or more read-only memory (ROM) chips; one or more hard disk drives or other magnetic or optical storage media; one or more solid state drives (SSDs), such as a flash drive or other solid-state storage media; and/or one or more hybrid magnetic and SSDs. Further in some implementations, the code 910 stored in the non-volatile memory may include an operating system and one or more applications or programs that are configured to execute under control of the operating system. In some implementations, the code 910 may additionally or alternatively include specialized firmware and embedded software that is executable without dependence upon a commercially available operating system. Regardless of its configuration, execution of the code 910 may result in manipulated data that may be stored in the data store 912 as one or more data structures. The data structures may have fields that are associated through location in the data structure. Such associations may likewise be achieved by allocating storage for the fields in locations within memory that convey an association between the fields. However, other mechanisms may be used to establish associations between information in fields of a data structure, including through the use of pointers, tags, or other mechanisms.

The processor 902 of the computing system 900 may be embodied by one or more processors that are configured to execute one or more executable instructions, such as a computer program specified by the code 910, to control the operations of the computing system 900. The function, operation, or sequence of operations can be hard coded into the circuitry or soft coded by way of instructions held in a memory device (e.g., the volatile memory 904) and executed by the circuitry. In some implementations, the processor 902 may be embodied by one or more application specific integrated circuits (ASICs), microprocessors, digital signal processors (DSPs), graphics processing units (GPUs), neural processing units (NPUs), microcontrollers, field programmable gate arrays (FPGAs), programmable logic arrays (PLAs), or multicore processors.

Prior to execution of the code 910, the processor 902 may copy the code 910 from the non-volatile memory 908 to the volatile memory 904. In some implementations, the volatile memory 904 may include one or more static or dynamic random access memory (RAM) chips and/or cache memory (e.g. memory disposed on a silicon die of the processor 902). Volatile memory 904 may offer a faster response time than a main memory, such as the non-volatile memory 908.

Through execution of the code 910, the processor 902 may control operation of the interfaces 906. The interfaces 906 may include network interfaces. Such network interfaces may include one or more physical interfaces (e.g., a radio, an ethernet port, a USB port, etc.) and a software stack including drivers and/or other code 910 that is configured to communicate with the one or more physical interfaces to support one or more LAN, PAN, and/or WAN standard communication protocols. Such communication protocols may include, for example, TCP and UDP among others. As such, the network interfaces may enable the computing system 900 to access and communicate with other computing devices via a computer network.

The interface(s) 906 may include one or more user interfaces. For instance, in some implementations, the user interface(s) 906 may include user input and/or output devices (e.g., a keyboard, a mouse, a touchscreen, a display, a speaker, a camera, an accelerometer, a biometric scanner, an environmental sensor, etc.) and a software stack including drivers and/or other code 910 that is configured to communicate with the user input and/or output devices. As such, the user interface(s) 906 may enable the computing system 900 to interact with users to receive input and/or render output. The rendered output may include, for example, one or more GUIs including one or more controls configured to display outputs and/or receive inputs. The received inputs may specify values to be stored in the data store 912. The displayed outputs may indicate values stored in the data store 912.

The various features of the computing system 900 described above may communicate with one another via the interconnection mechanism 914. In some implementations, the interconnection mechanism 914 may include a communications bus.

The following clauses describe example methods, systems, and computer-readable mediums that embody various aspects of the present disclosure.

Clause 1. A method, comprising: providing, by an application of a computing device, a user interface to (i) play back video within a first region of a screen and (ii) to display a plurality of interactive elements corresponding to features detected in the video, the plurality of interactive elements being displayed in a second region of the screen different from the first region; determining, by the application, that play back of the video has reached a first temporal position in the video that corresponds to a first interactive element of the plurality of interactive elements displayed in the second region; and causing, by the application, a change in an appearance of the first interactive element to visually distinguish the first interactive element from others of the plurality of interactive elements, the change being temporary so that upon advancement of play back of the video beyond the first temporal position the appearance of the first interactive element reverts back to the appearance as displayed before the first temporal position in the video was reached.

Clause 2. The method of clause 1, further comprising: determining, by the application, that the first interactive element has been selected; and causing, by the application and based at least in part on the first interactive element having been selected, playback of the video to jump to the first temporal position.

Clause 3. The method of clause 1, further comprising: determining, by the application, that play back of the video has reached a second temporal position in the video that corresponds to a second interactive element of the plurality of interactive elements displayed in the second region; and causing, by the application, the appearance of the first interactive element to revert back to the appearance as displayed before the first temporal position in the video was reached in response to the play back of the video having reached the second temporal position.

Clause 4. The method of clause 3, further comprising: determining, by the application, that the second interactive element is not currently displayed on the screen; and causing a list of interactive elements including at least the first interactive element and the second interactive element to scroll to reveal the second interactive element based at least in part on the second interactive element not currently being displayed on the screen.

Clause 5. The method of clause 4, further comprising: determining, by the application, that a user has not recently provided an input to adjust a relative position of the first interactive element within the second region; wherein causing the list of interactive elements to scroll is based at least in part on the user having not recently provided the input.

Clause 6. The method of clause 3, further comprising: determining, by the application, that the second interactive element is currently not displayed within the second region; determining, by the application, that a user provided an input to adjust a relative position of the first interactive element within the second region; and refraining, by the application and based least in part on the user having provide the input, from causing a list of interactive elements including at least the first interactive element and the second interactive element to scroll to reveal the second interactive element.

Clause 7. The method of clause 1, further comprising: after determining that play back of the video has reached the first temporal position, determining, by the application, that the first interactive element is not currently displayed on the screen; and causing a list of interactive elements including at least the first interactive element to scroll to reveal the first interactive element based at least in part on the first interactive element not currently being displayed on the screen.

Clause 8. The method of clause 7, further comprising: determining, by the application, that a user has not recently provided an input to adjust a relative position of the first interactive element within the second region; wherein causing the list of interactive elements to scroll is based at least in part on the user having not recently provided the input.

Clause 9. A system, comprising: one or more processors; and one or more computer-readable mediums encoded with instructions which, when executed by the one or more processors, cause the system to perform the method of any of clauses 1-8.

Clause 10. One or more non-transitory computer-readable mediums encoded with instructions which, when executed by one or more processors of a system, cause the system to perform the method of any of clauses 1-8.

Clause 11. A method, comprising: receiving, by an application, first data representing video of an event detected by a camera, second data representing at least first a first feature detected in the video, and third data indicative of a first temporal position within the video at which the first feature was detected; causing, by the application and using the first data, a device to play back at least a portion of the video within a first region of a screen; causing, by the application and using the second data, the device to display a first user interface (UI) element indicative of the first feature within a second region of the screen; determining, by the application, that playback of the video has reached the first temporal position; and causing, by the application and based at least in part the third data and the playback of the video having reached the first temporal position, a change in an appearance of the first UI element to visually distinguish the first UI element from at least a second UI element displayed on the screen, the second UI element being indicative of a second feature detected in the video.

Clause 12. The method of clause 11, further comprising: determining, by the application, that the first UI element has been selected; and causing, by the application and based at least in part on the first UI element having been selected, playback of the video to jump to the first temporal position.

Clause 13. The method of clause 11, further comprising: receiving, by the application, fourth data representing the second feature detected in the video, and fifth data indicative of a second temporal position within the video at which the second feature was detected; causing, by the application and using the fourth data, the device to display the second UI element together with the first UI element; determining, by the application, that playback of the video has reached the second temporal position; and causing, by the application and based at least in part the fifth data and the playback of the video having reached the second temporal position, the device to change an appearance of the second UI element to visually distinguish the second UI element from at least the first UI element displayed on the screen.

Clause 14. The method of clause 13, further comprising: determining, by the application, that the second UI element is not currently displayed on the screen; wherein causing the device to display the second UI element comprises causing a list of UI elements including at least the first UI element and the second UI element to scroll to reveal the second UI element.

Clause 15. The method of clause 14, further comprising: determining, by the application, that a user has not recently provided an input to adjust a relative position of the first UI element within the second region; wherein causing the list of UI elements to scroll is based at least in part on the user having not recently provided the input.

Clause 16. The method of clause 11, further comprising: determining, by the application, that the first UI element is not currently displayed on the screen; wherein causing the device to display the first UI element comprises causing a list of UI elements including at least the first UI element and a second UI element to scroll to reveal the first UI element.

Clause 17. The method of clause 16, further comprising: determining, by the application, that a user has not recently provided an input to adjust a relative position of the first UI element within the second region; wherein causing the list of UI elements to scroll is based at least in part on the user having not recently provided the input.

Clause 18. The method of clause 11, further comprising: receiving, by the application, fourth data representing the second feature detected in the video, and fifth data indicative of a second temporal position within the video at which the second feature was detected; determining, by the application, that playback of the video has reached the second temporal position; determining, by the application, that the second UI element associated with the second feature is currently not displayed within the second region; determining, by the application, that a user provided an input to adjust a relative position of the first UI element within the second region; and refraining, by the application and based least in part on the user having provide the input, from causing a list of UI elements including at least the first UI element and the second UI element to scroll to reveal the second UI element.

Clause 19. A system, comprising: one or more processors; and one or more computer-readable mediums encoded with instructions which, when executed by the one or more processors, cause the system to perform the method of any of clauses 11-18.

Clause 20. One or more non-transitory computer-readable mediums encoded with instructions which, when executed by one or more processors of a system, cause the system to perform the method of any of clauses 11-18.

Various inventive concepts may be embodied as one or more methods, of which examples have been provided. The acts performed as part of a method may be ordered in any suitable way. Accordingly, examples may be constructed in which acts are performed in an order different than illustrated, which may include performing some acts simultaneously, even though shown as sequential acts in illustrative examples.

Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term).

Examples of the methods and systems discussed herein are not limited in application to the details of construction and the arrangement of components set forth in the following description or illustrated in the accompanying drawings. The methods and systems are capable of implementation in other examples and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, components, elements or acts of the systems and methods herein referred to in the singular can also embrace examples including a plurality, and any references in plural to any example, component, element or act herein can also embrace examples including only a singularity. References in the singular or plural form are not intended to limit the presently disclosed systems or methods, their components, acts, or elements.

The use herein of "including," "comprising," "having," "containing," "involving," and variations thereof is meant to encompass the items listed thereafter and equivalents thereof as well as additional items. References to "or" can be construed as inclusive so that any terms described using "or" can indicate any of a single, more than one, and all of the described terms. In addition, in the event of inconsistent usages of terms between this document and documents incorporated herein by reference, the term usage in the incorporated references is supplementary to that of this document; for irreconcilable inconsistencies, the term usage in this document controls.

Having described several examples in detail, various modifications and improvements will readily occur to those skilled in the art. Such modifications and improvements are intended to be within the scope of this disclosure. Accordingly, the foregoing description is by way of example only, and is not intended as limiting.

What is claimed is:

1. A method, comprising:
receiving, by an application, first data representing video of an event detected by a camera, second data representing at least first a first feature detected in the video, and third data indicative of a first temporal position within the video at which the first feature was detected;
causing, by the application and using the first data, a device to play back at least a portion of the video within a first region of a screen;
causing, by the application and using the second data, the device to display a first user interface (UI) element indicative of the first feature within a second region of the screen;
determining, by the application, that playback of the video has reached the first temporal position; and
causing, by the application and based at least in part the third data and the playback of the video having reached the first temporal position, a change in an appearance of the first UI element to visually distinguish the first UI element from at least a second UI element displayed on the screen, the second UI element being indicative of a second feature detected in the video.

2. The method of claim 1, further comprising:
determining, by the application, that the first UI element has been selected; and
causing, by the application and based at least in part on the first UI element having been selected, playback of the video to jump to the first temporal position.

3. The method of claim 1, further comprising:
receiving, by the application, fourth data representing the second feature detected in the video, and fifth data indicative of a second temporal position within the video at which the second feature was detected;
causing, by the application and using the fourth data, the device to display the second UI element together with the first UI element;
determining, by the application, that playback of the video has reached the second temporal position; and
causing, by the application and based at least in part the fifth data and the playback of the video having reached the second temporal position, the device to change an appearance of the second UI element to visually distinguish the second UI element from at least the first UI element displayed on the screen.

4. The method of claim 3, further comprising:
determining, by the application, that the second UI element is not currently displayed on the screen;
wherein causing the device to display the second UI element comprises causing a list of UI elements including at least the first UI element and the second UI element to scroll to reveal the second UI element.

5. The method of claim 4, further comprising:
determining, by the application, that a user has not recently provided an input to adjust a relative position of the first UI element within the second region;
wherein causing the list of UI elements to scroll is based at least in part on the user having not recently provided the input.

6. The method of claim 1, further comprising:
determining, by the application, that the first UI element is not currently displayed on the screen;
wherein causing the device to display the first UI element comprises causing a list of UI elements including at least the first UI element and a second UI element to scroll to reveal the first UI element.

7. The method of claim 6, further comprising:
determining, by the application, that a user has not recently provided an input to adjust a relative position of the first UI element within the second region;
wherein causing the list of UI elements to scroll is based at least in part on the user having not recently provided the input.

8. The method of claim 1, further comprising:
receiving, by the application, fourth data representing the second feature detected in the video, and fifth data indicative of a second temporal position within the video at which the second feature was detected;
determining, by the application, that playback of the video has reached the second temporal position;
determining, by the application, that the second UI element associated with the second feature is currently not displayed within the second region;
determining, by the application, that a user provided an input to adjust a relative position of the first UI element within the second region; and
refraining, by the application and based least in part on the user having provide the input, from causing a list of UI elements including at least the first UI element and the second UI element to scroll to reveal the second UI element.

9. A system, comprising:
one or more processors; and
one or more computer-readable mediums encoded with instructions which, when executed by the one or more processors, cause the system to:
receive, by an application, first data representing video of an event detected by a camera, second data representing at least first a first feature detected in the video, and third data indicative of a first temporal position within the video at which the first feature was detected;
cause, by the application and using the first data, a device to play back at least a portion of the video within a first region of a screen;
cause, by the application and using the second data, the device to display a first user interface (UI) element indicative of the first feature within a second region of the screen;
determine, by the application, that playback of the video has reached the first temporal position; and
cause, by the application and based at least in part the third data and the playback of the video having reached the first temporal position, a change in an appearance of the first UI element to visually distinguish the first UI element from at least a second UI element displayed on the screen, the second UI element being indicative of a second feature detected in the video.

10. The system of claim 9, wherein the one or more computer-readable mediums are further encoded with additional instructions which, when executed by the one or more processors, further cause the system to:
determine, by the application, that the first UI element has been selected; and
cause, by the application and based at least in part on the first UI element having been selected, playback of the video to jump to the first temporal position.

11. The system of claim 9, wherein the one or more computer-readable mediums are further encoded with additional instructions which, when executed by the one or more processors, further cause the system to:
receive, by the application, fourth data representing the second feature detected in the video, and fifth data indicative of a second temporal position within the video at which the second feature was detected;
cause, by the application and using the fourth data, the device to display the second UI element together with the first UI element;
determine, by the application, that playback of the video has reached the second temporal position; and
cause, by the application and based at least in part the fifth data and the playback of the video having reached the second temporal position, the device to change an appearance of the second UI element to visually distinguish the second UI element from at least the first UI element displayed on the screen.

12. The system of claim 11, wherein the one or more computer-readable mediums are further encoded with additional instructions which, when executed by the one or more processors, further cause the system to:
determine, by the application, that the second UI element is not currently displayed on the screen; and
cause the device to display the second UI element at least in part by causing a list of UI elements including at least the first UI element and the second UI element to scroll to reveal the second UI element.

13. The system of claim 12, wherein the one or more computer-readable mediums are further encoded with additional instructions which, when executed by the one or more processors, further cause the system to:
determine, by the application, that a user has not recently provided an input to adjust a relative position of the first UI element within the second region; and
cause the list of UI elements to scroll based at least in part on the user having not recently provided the input.

14. The system of claim 9, wherein the one or more computer-readable mediums are further encoded with additional instructions which, when executed by the one or more processors, further cause the system to:
determine, by the application, that the first UI element is not currently displayed on the screen; and
cause the device to display the first UI element at least in part by causing a list of UI elements including at least the first UI element and a second UI element to scroll to reveal the first UI element.

15. The system of claim 14, wherein the one or more computer-readable mediums are further encoded with additional instructions which, when executed by the one or more processors, further cause the system to:
determine, by the application, that a user has not recently provided an input to adjust a relative position of the first UI element within the second region; and
cause the list of UI elements to scroll based at least in part on the user having not recently provided the input.

16. The system of claim 9, wherein the one or more computer-readable mediums are further encoded with additional instructions which, when executed by the one or more processors, further cause the system to:
receive, by the application, fourth data representing the second feature detected in the video, and fifth data indicative of a second temporal position within the video at which the second feature was detected;
determine, by the application, that playback of the video has reached the second temporal position;
determine, by the application, that the second UI element associated with the second feature is currently not displayed within the second region;
determine, by the application, that a user provided an input to adjust a relative position of the first UI element within the second region; and
refrain, by the application and based least in part on the user having provide the input, from causing a list of UI elements including at least the first UI element and the second UI element to scroll to reveal the second UI element.

17. One or more non-transitory computer-readable mediums encoded with instructions which, when executed by one or more processors of a system, cause the system to:
- receive, by an application, first data representing video of an event detected by a camera, second data representing at least first a first feature detected in the video, and third data indicative of a first temporal position within the video at which the first feature was detected;
- cause, by the application and using the first data, a device to play back at least a portion of the video within a first region of a screen;
- cause, by the application and using the second data, the device to display a first user interface (UI) element indicative of the first feature within a second region of the screen;
- determine, by the application, that playback of the video has reached the first temporal position; and
- cause, by the application and based at least in part the third data and the playback of the video having reached the first temporal position, a change in an appearance of the first UI element to visually distinguish the first UI element from at least a second UI element displayed on the screen, the second UI element being indicative of a second feature detected in the video.

18. The one or more non-transitory computer-readable mediums of claim 17, further encoded with additional instructions which, when executed by the one or more processors, further cause the system to:
- determine, by the application, that the first UI element has been selected; and
- cause, by the application and based at least in part on the first UI element having been selected, playback of the video to jump to the first temporal position.

19. The one or more non-transitory computer-readable mediums of claim 17, further encoded with additional instructions which, when executed by the one or more processors, further cause the system to:
- receive, by the application, fourth data representing the second feature detected in the video, and fifth data indicative of a second temporal position within the video at which the second feature was detected;
- cause, by the application and using the fourth data, the device to display the second UI element together with the first UI element;
- determine, by the application, that playback of the video has reached the second temporal position; and
- cause, by the application and based at least in part the fifth data and the playback of the video having reached the second temporal position, the device to change an appearance of the second UI element to visually distinguish the second UI element from at least the first UI element displayed on the screen.

20. The one or more non-transitory computer-readable mediums of claim 19, further encoded with additional instructions which, when executed by the one or more processors, further cause the system to:
- determine, by the application, that the second UI element is not currently displayed on the screen; and
- cause the device to display the second UI element at least in part by causing a list of UI elements including at least the first UI element and the second UI element to scroll to reveal the second UI element.

* * * * *